(12) United States Patent
Aono et al.

(10) Patent No.: US 7,438,404 B2
(45) Date of Patent: Oct. 21, 2008

(54) INK-JET RECORDING INK AND IMAGE-FORMING METHOD

(75) Inventors: Toshiaki Aono, Shizuoka-ken (JP); Kenji Ikeda, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 10/765,929

(22) Filed: Jan. 29, 2004

(65) Prior Publication Data

US 2004/0189764 A1 Sep. 30, 2004

(30) Foreign Application Priority Data

Jan. 31, 2003 (JP) ............................. 2003-024530

(51) Int. Cl.
*C09D 11/00* (2006.01)
(52) U.S. Cl. ................ 347/100; 106/31.13; 106/31.27; 106/31.6
(58) Field of Classification Search ................ 347/100; 106/31.13, 31.27, 31.6
See application file for complete search history.

(56) References Cited

U.S. PATENT DOCUMENTS

| | | | |
|---|---|---|---|
| 5,753,422 A * | 5/1998 | Shibahara et al. ............. 430/379 |
| 6,048,660 A * | 4/2000 | Leppard et al. ............. 430/270.1 |
| 6,068,963 A | 5/2000 | Aoshima |
| 6,509,125 B1 * | 1/2003 | Ito et al. ......................... 430/7 |
| 6,521,031 B2 * | 2/2003 | Kimura et al. ............ 106/31.47 |
| 2002/0060727 A1 | 5/2002 | Nishita |
| 2002/0067399 A1 * | 6/2002 | Yabuki et al. ................ 347/100 |
| 2002/0143079 A1 | 10/2002 | Yamanouchi et al. |
| 2003/0061965 A1 * | 4/2003 | Taguchi .................... 106/31.27 |
| 2004/0239740 A1 | 12/2004 | Aono et al. |
| 2005/0073563 A1 * | 4/2005 | Hanaki et al. ............... 347/100 |

FOREIGN PATENT DOCUMENTS

| JP | 54130620 A | 10/1979 |
|---|---|---|
| JP | 58-108207 A | 6/1983 |
| JP | 04-185673 A | 7/1992 |
| JP | 7-219113 A | 8/1995 |
| JP | 7-268254 A | 10/1995 |
| JP | 09176543 A | 7/1997 |
| JP | 10-110126 A | 4/1998 |
| JP | 10095942 A * | 4/1998 |
| JP | 2001172532 A | 6/2001 |
| JP | 2001181548 A * | 7/2001 |
| JP | 2002088294 A * | 3/2002 |
| JP | 2002-161225 A | 6/2002 |
| JP | 2002-249695 A | 9/2002 |
| JP | 2002-322399 A | 11/2002 |
| JP | 2003-84381 A | 3/2003 |

* cited by examiner

*Primary Examiner*—Manish S. Shah
*Assistant Examiner*—Laura E Martin
(74) *Attorney, Agent, or Firm*—Sughrue Mion, PLLC

(57) ABSTRACT

The present invention provides an ink-jet recording ink which includes colored fine particles including an oil-soluble dye and an oil-soluble polymer or a photopolymerizable monomer, and a compound represented by formula (I):

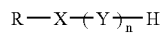

wherein R represents a hydrophobic group or a group derived from a hydrophobic polymer; X represents a divalent linking group; Y represents a group including at least one represented by the structural units A, C and D, and 0 to 40% by mole of the structural unit B; and n is an integer of 10 to 3,500;

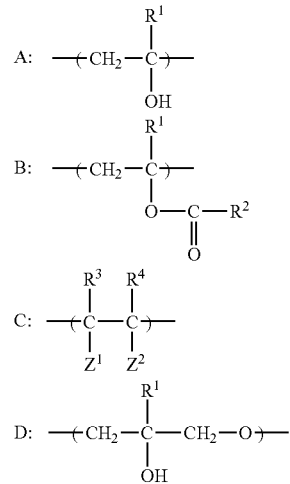

wherein $R^1$ represents H or alkyl; $R^2$ represents H or alkyl; $R^3$ represents H or methyl; $R^4$ represents H, $-CH_3$, $-CH_2COOH$ or $-CN$; $Z^1$ represents H, $-COOH$ or $-CONH_2$; $Z^2$ represents $-COOH$, $-SO_3H$, $-OSO_3H$, $-CH_2SO_3H$, $-CONHC(CH_3)_2CH_2SO_3H$ or $-CONHCH_2CH_2CH_2N^+(CH_3)_3Cl^-$.

34 Claims, No Drawings

INK-JET RECORDING INK AND IMAGE-FORMING METHOD

CROSS-REFERENCE TO RELATED APPLICATION

This application claims priority under 35 USC 119 from Japanese Patent Application No. 2003-24530, the disclosure of which is incorporated by reference herein.

BACKGROUND OF THE INVENTION

1. Field of the Invention

The present invention relates to an ink-jet recording ink and an image-forming method, in particular to an ink-jet recording ink comprising an oil-soluble dye as the coloring ingredient, and an image-forming method using the ink.

2. Description of the Related Art

Concomitant with the spread of computers in recent years, ink-jet printers have been widely used for printing on paper, film and cloth, not only in offices but also in homes. As inks for ink-jet recording, an oil-based ink, an aqueous ink and a solid ink are known, and in particular, the aqueous ink is advantageous in terms of easiness of production, handling, odor and safety, and hence is mainly used.

Most aqueous inks make use of water-soluble dyes dissolved in a molecular state and thus have the merits of high transparency and high color density. However, because the dyes are water-soluble, aqueous inks suffer from the disadvantages of poor water resistance and easily bleeding when printing on paper thus leading to a serious deterioration in the quality of printing and poor light resistance. A marked deterioration in image storability also results from the influence of oxidizing gases ($SO_x$, $NO_x$, ozone etc.) on a recording paper (hereinafter referred to as photographic paper) provided with an ink-receiving layer thereon containing porous inorganic fine particles.

In order to solve the problems described above, aqueous inks using a pigment or a disperse dye are proposed (see, for example, Japanese Patent Application Laid-Open (JP-A) Nos. 56-157468, 4-18468, 10-110126 and 10-195355). These aqueous inks have improved in terms of water resistance to a certain degree, but they cannot yet be said to have reached a satisfactory level. Aqueous inks also have a problem of poor dispersion stability of the pigment or the disperse dye therein, and clogging has tended to occur frequently at an ink discharge opening. Further, there have also been the problems that the ink using the pigment or the disperse dye is not easily absorbed by photographic paper, and that in consequence the pigment or the dye is easily removed from the surface when rubbed by hand. Incidentally, a disperse dye means an oil-soluble dye dispersed as oil droplets in water.

A method of incorporating a dye into dispersed particles of urethane or polyester has also been proposed (see, for example, JP-A Nos. 58-45272, 6-340835, 7-268254, 7-268257 and 7-268260). However, the ink for an ink-jet obtained by this method is poor in color tone and also inferior in terms of color reproducibility and discoloration properties. Further, the ink used in printing on photographic paper is poor in abrasion resistance when rubbed with an eraser.

Also, a technique has been disclosed which uses a water-soluble dye system and forms a vivid image without generating spots or irregular dots (see, for example, JP-A No. 10-95942).

SUMMARY OF THE INVENTION

An aqueous ink prepared using a disperse dye comprising an oil-soluble dye dispersed as oil droplets in water is excellent in terms of handling, odor and safety. However, such an aqueous ink has not yet reached a stage of which dispersion stability can be secured through producing a smaller size of particle of dispersed droplets, and at the same time maintaining both stable dispersability, that is avoidance of aggregation of dispersed droplets, and also a degree of storability sufficient to prevent a deterioration in dispersability occurring over a prolonged period. Another problem has been that when an ink prepared with the use of a disperse dye is employed as an ink-jet recording ink, the ink remaining at the tip of a nozzle of a printer may be precipitated and in consequence cause clogging. Moreover, after clogging occurs, the dye which has once been precipitated cannot be easily removed even when a nozzle which has been clogged up is washed (cleaned). This clogging tends to occur increasingly frequently as the level of dispersability becomes lower.

The present invention was made in view of the foregoing and to achieve the following.

That is, an object of the invention is to provide an ink-jet recording ink which comprises a disperse dye in which an oil-soluble dye is dispersed in an aqueous phase as oil droplets (oil phase), and the dispersed oil droplets (dispersed droplets) have a small particle diameter, and in which the ink-jet recording ink has excellent dispersion stability and storability over a prolonged period, suppresses clogging at the tip of a nozzle, and is superior in its cleanability when clogging occurs.

Another object of the invention is to provide an image-forming method with which high-quality images can be formed in a stable manner with the use of the above-described ink-jet recording ink, without either impairing image quality or creating problems in image formation as a result of deficiencies at the discharge opening.

Specific means to solve the aforementioned problems are as follows:

A first aspect of the invention is to provide an ink-jet recording ink which comprises colored fine particles including an oil-soluble dye and an oil-soluble polymer, and a compound represented by formula (I):

$$R-X-(Y)_n-H \qquad \text{Formula (I)}$$

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

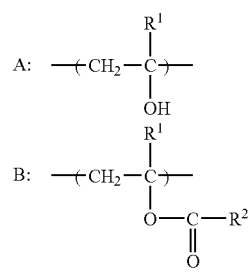

-continued

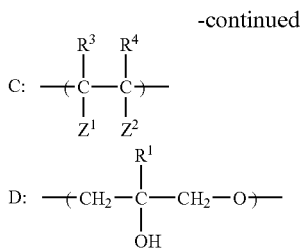

wherein, in the structural units A, B, C and D, $R^1$ represents a hydrogen atom or a $C_1$-$C_6$ alkyl group; $R^2$ represents a hydrogen atom or a $C_1$-$C_{10}$ alkyl group; $R^3$ represents a hydrogen atom or a methyl group; $R^4$ represents a hydrogen atom, —$CH_3$, —$CH_2COOH$ (including an ammonium salt or an alkali metal salt thereof) or —CN; $Z^1$ represents a hydrogen atom, —COOH (including an ammonium salt or an alkali metal salt thereof) or —$CONH_2$; $Z^2$ represents —COOH (including an ammonium salt or an alkali metal salt thereof), —$SO_3H$ (including an ammonium salt or an alkali metal salt thereof), —$OSO_3H$ (including an ammonium salt or an alkali metal salt thereof), —$CH_2SO_3H$ (including an ammonium salt or an alkali metal salt thereof), —$CONHC(CH_3)_2CH_2SO_3H$ (including an ammonium salt or an alkali metal salt thereof) or —$CONHCH_2CH_2CH_2N^+(CH_3)_3Cl^-$.

In the ink-jet recording ink, it is preferable that the oil-soluble polymer has a dissociable group, and that the dissociable group is present in the oil-soluble polymer in an amount of 0.2 to 4.0 mmol/g.

In the ink-jet recording ink, it is preferable that the dissociable group is at least one of a carboxyl group and a sulfonic acid group.

In the ink-jet recording ink, it is preferable that the colored fine particles are prepared by adding to the aqueous phase an organic phase (oil phase) including an oil-soluble dye and an oil-soluble polymer and emulsifying and dispersing a resultant mixture.

A second aspect of the invention is an ink-jet recording ink which comprises colored fine particles including an oil-soluble dye and a photopolymerizable monomer, and a compound represented by formula (I):

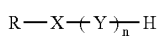

Formula (I)

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

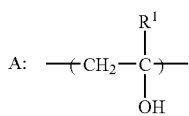

-continued

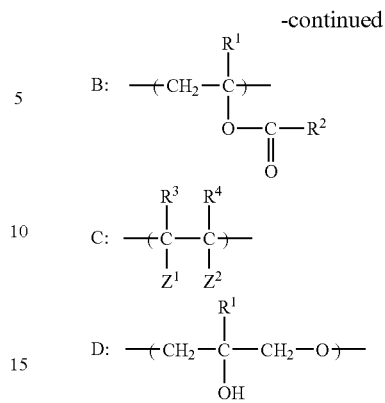

wherein, in the structural units A, B, C and D, $R^1$ represents a hydrogen atom or a $C_1$-$C_6$ alkyl group; $R^2$ represents a hydrogen atom or a $C_1$-$C_{10}$ alkyl group; $R^3$ represents a hydrogen atom or a methyl group; $R^4$ represents a hydrogen atom, —$CH_3$, —$CH_2COOH$ (including an ammonium salt or an alkali metal salt thereof or —CN; $Z^1$ represents a hydrogen atom, —COOH (including an ammonium salt or an alkali metal salt thereof or —$CONH_2$; $Z^2$ represents —COOH (including an ammonium salt or an alkali metal salt thereof, —$SO_3H$ (including an ammonium salt or an alkali metal salt thereof, —$OSO_3H$ (including an ammonium salt or an alkali metal salt thereof, —$CH_2SO_3H$ (including an ammonium salt or an alkali metal salt thereof, —$CONHC(CH_3)_2CH_2SO_3H$ (including an ammonium salt or an alkali metal salt thereof or —$CONHCH_2CH_2CH_2N^+(CH_3)_3Cl^-$.

In the ink-jet recording ink, it is preferred that the colored fine particles are prepared by adding to the aqueous phase an organic phase (oil phase) containing an oil-soluble dye and a photopolymerizable monomer, and emulsifying and dispersing a resultant mixture.

In the ink-jet recording ink, it is preferred that the hydrophobic group is an aliphatic group, an aromatic group or an alicyclic group.

In the ink-jet recording ink, it is preferred that R is a group derived from at least one hydrophobic polymer selected from polystyrene, polymethacrylate, polyacrylate, polyvinyl chloride, and derivatives thereof.

A third aspect of the invention is to provide an image-forming method which comprises using the ink-jet recording ink of the invention for forming an image.

DETAILED DESCRIPTION OF THE INVENTION

Hereinafter, an ink-jet recording ink and an image-forming method using the same ink according to the present invention are described in more detail.

The ink-jet recording ink of the invention comprises colored fine particles and a compound represented by formula (I) shown below and may contain additional components, as necessary.

(Colored Fine Particles)

The colored fine particles relating to the invention comprise at least an oil-soluble dye and an oil-soluble polymer or a photopolymerizable monomer, and generally includes a high-boiling organic solvent and other components, as necessary.

-Oil-soluble Dye-

The colored fine particles forming the ink-jet recording ink of the invention may comprise an oil-soluble dye. The oil-soluble dye refers to a dye substantially insoluble in water, and specifically to a colorant whose solubility in water at 25° C. (an amount of the dye soluble in 100 g of water) is 1 g or less. This solubility is preferably 0.5 g or less, more preferably 0.1 g or less.

The oil-soluble dye is preferably the one having a melting point of 200° C. or less, more preferably 150° C. or less, still more preferably 100° C. or less. The oil-soluble dye having a lower melting point can be used to prevent the dye from being crystallized and precipitated, thus improving the dispersion stability and shelf stability of the ink-jet recording ink with time.

The oil-soluble dyes may be used alone or in combination of two or more thereof. Coloring materials such as other water-soluble dyes, disperse dyes and pigments may also be contained if necessary in such a range that the effect of the invention is not adversely affected.

The oil-soluble dye includes, for example, an anthraquinone dye, naphthoquinone dye, styryl dye, indoaniline dye, azo dye, nitro dye, coumarin dye, methine dye, porphyrin dye, azaporphyrin dye and phthalocyanine dye. Usually, at least 4 dyes, i.e., yellow (Y), magenta (M) and cyan (C) as three primary colors, plus black (K), are necessary for full-color printing.

Among the oil-soluble dyes described above, an arbitrary yellow dye may be selected. Examples thereof include aryl or heteryl azo dyes having phenols, naphthols, anilines, pyrazolones, pyridones, and open-chained active methylene compounds as the coupling component; azomethine dyes having open-chained active methylene compounds as the coupling component; methine dyes such as benzylidene dye and monomethine oxonol dye; quinone dyes such as naphthoquinone dye and anthraquinone dye, and additionally include quinophthalone dyes, nitro/nitroso dyes, acridine dyes, acridinone dyes, etc.

As the magenta dye, an arbitrary magenta dye may be selected. Examples thereof include aryl or heteryl azo dyes having phenols, naphthols and anilines as the coupling component; azomethine dyes having pyrazolones and pyrazolotriazoles as the coupling component; methine dyes such as arylidene dye, styryl dye, merocyanine dye and oxonol dye; carbonium dyes such as diphenylmethane dye, triphenylmethane dye and xanthene dye; quinone dyes such as naphthoquinone, anthraquinone and anthrapyridone; and condensed polycyclic dyes such as dioxazine dye.

As the cyan dye, an arbitrary cyan dye may be selected. Examples thereof include indoaniline dyes, indophenol dyes, or azomethine dyes having pyrrolotriazoles as the coupling component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl or heteryl azo dyes having phenols, naphthols or anilines as the coupling component; and indigo/thioindigo dyes.

These dyes may have properties to show color of yellow, magenta or cyan upon dissociation of a part of their chromophore, and the counter cation in respective cases may be an inorganic cation such as alkali metal or ammonium, or an organic cation such as pyridinium and quaternary ammonium salt, or a polymer cation having such a cation as a partial structure.

Among the oil-soluble dyes described above, illustrative examples are listed below. However, the invention is not limited thereto.

Preferable examples include C. I. Solvent Black 3, 7, 27, 29 and 34; C. I. Solvent Yellow 14, 16, 19, 29, 30, 56, 82, 93 and 162; C. I. Solvent Red 1, 3, 8, 18, 24, 27, 43, 49, 51, 72, 73, 109, 122, 132 and 218; C. I. Solvent Violet 3; C. I. Solvent Blue 2, 11, 25, 35, 38, 67 and 70; C. I. Solvent Green 3 and 7; and C. I. Solvent Orange 2, etc.

More preferable among those listed above are Nubian Black PC-0850, Oil Black HBB, Oil Yellow 129, Oil yellow 105, Oil Pink 312, Oil Red 5B, Oil Scarlet 308, Vali Fast Blue 2606, Oil Blue BOS (Orient Chemical Industries, Ltd.), Aizen Spilon Blue GNH (Hodogaya Chemical Co., Ltd.), Neopen Yellow 075, Neopen Magenta SE 1378, Neopen Blue 808, Neopen Blue FF4012, Neopen Cyan FF4238 (BASF), etc.

In the invention, a disperse dye may also be used in a range soluble in a water-immiscible organic solvent, and illustrative examples thereof include the following examples. However, the invention is not limited thereto.

Preferable examples include C. I. Disperse Yellow 5, 42, 54, 64, 79, 82, 83, 93, 99, 100, 119, 122, 124, 126, 160, 184:1, 186, 198, 199, 201, 204, 224 and 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C. I. Disperse Green 6:1 and 9.

Among those listed above, suitably usable are compounds (azo dyes) represented by formula (1) shown below and compounds (azomethine dyes) represented by formula (2) shown below. In the field of photographic materials, the azomethine dyes represented by formula (2) are known as the dyes formed by coupling reaction of a coupler with an oxidation product of a developing agent.

Next, the compounds represented by formula (1) or (2) are described in more detail. The compounds of formulae (1) and (2) are preferably those that have at least one group, preferably two or more groups, and more preferably all groups are shown below.

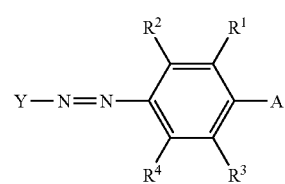

Formula (1)

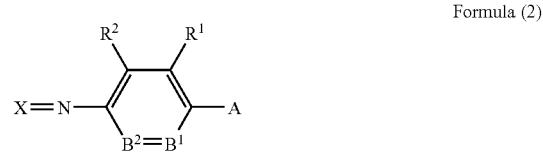

Formula (2)

In formulae (1) and (2), $R^1$, $R^2$, $R^3$ and $R^4$ each independently represent a hydrogen atom, halogen atom, aliphatic group, aromatic group, heterocyclic group, cyano group, hydroxy group, nitro group, amino group, alkylamino group, alkoxy group, aryloxy group, amide group, arylamino group, ureido group, sulfamoylamino group, alkylthio group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, sulfinyl group, phosphoryl group, acyl group, carboxyl group or sulfo group.

In particular, $R^2$ is preferably a hydrogen atom, halogen atom, aliphatic group, alkoxy group, aryloxy group, amide group, ureido group, sulfamoylamino group, alkoxycarbonylamino group or sulfonamide group.

In formulae (1) and (2), A represents —$NR^5R^6$ or a hydroxyl group. A is preferably —$NR^5R^6$.

The above-mentioned $R^5$ and $R^6$ each independently represent a hydrogen atom, aliphatic group, aromatic group or heterocyclic group. More preferably, $R^5$ and $R^6$ each independently represent a hydrogen atom, optionally substituted alkyl group, or optionally substituted aryl group, and most preferably a hydrogen atom, $C_{1-18}$ alkyl group or optionally substituted $C_{1-18}$ alkyl group. $R^5$ and $R^6$ may be bound to each other to form a ring.

In formula (2), $B^1$ represents =$C(R^3)$— or =N—. $B^2$ represents —$C(R^4)$= or —N=. It is preferable that $B^1$ and $B^2$ does not simultaneously represent —N=, and it is more preferable that $B^1$ is =$C(R^3)$— and $B^2$ is —$C(R^4)$=.

In formulae (1) and (2), $R^1$ and $R^5$, $R^3$ and $R^6$, and/or $R^1$ and $R^2$ may be bound to each other to form an aromatic or heterocyclic ring.

As used herein, the aliphatic group refers to an alkyl group, substituted alkyl group, alkenyl group, substituted alkenyl group, alkynyl group, substituted alkynyl group, aralkyl group and substituted aralkyl group. The aliphatic group may be branched or cyclic. The number of carbon atoms in the aliphatic group is preferably 1 to 20, and more preferably 1 to 18.

The aryl moiety in the aralkyl group and in the substituted aralkyl group is preferably a phenyl or naphthyl group, and more preferably a phenyl group.

Substituent groups on the alkyl moiety in the substituted alkyl group, substituted alkenyl group, substituted alkynyl group and substituted aralkyl group include the same substituent groups as defined above for $R^1$, $R^2$, $R^3$ and $R^4$.

Substituent groups on the aryl moiety in the substituted aralkyl group include the same substituent groups as mentioned later in the substituted aryl group.

As used herein, the aromatic group refers to an aryl group and substituted aryl group. The aryl group is preferably a phenyl or naphthyl group, and more preferably a phenyl group.

The aryl moiety in the substituted aryl group is the same as defined for the above aryl group.

Substituent groups on the substituted aryl group include the same substituent groups as defined above for $R^1$, $R^2$, $R^3$ and $R^4$.

In formula (1), Y represents an unsaturated heterocyclic group, preferably a 5- or 6-memberred unsaturated heterocyclic ring. An aliphatic ring, an aromatic ring or another heterocyclic ring may be condensed with the heterocyclic ring. Examples of heteroatoms in the heterocyclic ring may include N, O and S. Preferable examples of the unsaturated heterocyclic ring include a pyrazol ring, imidazole ring, thiazole ring, isothiazole ring, thiadiazole ring, thiophene ring, benzothiazole ring, benzoxazole ring, benzoisothiazole ring, pyrimidine ring, pyridine ring and quinoline ring. The unsaturated heterocyclic group may have the substituent groups mentioned for $R^1$ to $R^4$ above.

In formula (2), X represents a moiety of a photographic color coupler. Preferable examples of the coupler are listed as follows:

Examples of the yellow dye-forming coupler include those described in U.S. Pat. Nos. 3,933,501, 4,022,620, 4,326,024, 4,401,752, 4,248,961, Japanese Patent Application Publication (JP-B) No. 58-10739, GB-C1,425,020, GB-C1,476,760, U.S. Pat. Nos. 3,973,968, 4,314,023, 4,511,649, EP No. 249, 743A, couplers represented by formula (I) and (II) in EP No. 502,424A, couplers (particularly Y-28 on page 18) represented by formula (1) and (2) in EP No. 513,496A, couplers represented by formula (I) in EP No. 568,037A, couplers represented by formula (I) at lines 45 to 55 at column 1 in U.S. Pat. No. 5,066,576, couplers represented by formula (I) in column 0008 in JP-A No. 4-274425, couplers (particularly D-35 on page 18) stated in claim 1 on page 40 in EP No. 498,381A1, couplers (particularly Y-1 (page 17) and Y-54 (page 41)) represented by formula (Y) on page 4 in EP No. 447,969A1, and couplers (particularly 11-17, 19 (column 17) and 11-24 (column 19)) represented by formula (II) to (4) in lines 36 to 58 in column 7 in U.S. Pat. No. 4,476,219.

Examples of the magenta dye-forming coupler include those described in U.S. Pat. Nos. 4,310,619, 4,351,897, EP No. 73,636, U.S. Pat. Nos. 3,061,432, 3,725,067, Research Disclosure No. 24220 (June, 1984), Research Disclosure No. 24230 (June, 1984), JP-A Nos. 60-33552, 60-43659, 61-72238, 60-35730, 55-118034, 60-185951, U.S. Pat. Nos. 4,500,630, 4,540,654, 4,556,630, WO 88/04795, L-57 (lower right column on page 11), L-68 (lower right column on page 12) and L-77 (lower right column on page 13) in JP-A No. 3-39737, [A-4]-63 (page 134), [A-4]-73, -75 (page 139) in EP No. 456,257, M-4, -6 (page 26) and M-7 (page 27) in EP No. 486,965, M-45 (page 19) in EP No. 571,959A, (M-1) (page 6) in JP-A No. 5-204106, and M-22 in column 0237 in JP-A No. 4-362631.

Examples of the cyan dye-forming coupler include those described in U.S. Pat. Nos. 4,052,212, 4,146,396, 4,228,233, 4,296,200, EP 73,636, CX-1, 3, 4, 5, 11, 12, 14 and 15 (pages 14 to 16) in JP-A No. 4-204843; C-7, 10 (page 35), 34, 35 (page 37), (I-1), (I-17) (pages 42 to 43) in JP-A No. 4-43345; and couplers represented by formula (Ia) or (Ib) in the first aspect in JP-A No. 6-67385.

Further, couplers described in JP-A No. 62-215272 (page 91), JP-A No. 2-33144 (pages 3 and 30), and EP No. 355, 660A (pages 4, 5, 45 and 47) are also useful.

Among the dyes represented by formula (1) above, dyes represented by the following formula (3) are particularly preferable as magenta dyes.

Formula (3)

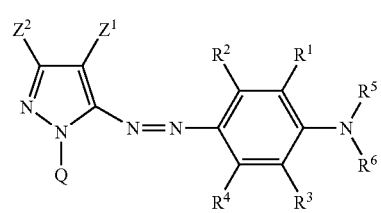

In formula (3) shown above, $Z^1$ represents an electron-withdrawing group having a Hammett's substituent constant $\sigma_p$ value of 0.20 or more, preferably an electron-withdrawing group having a $\sigma_p$ value of 0.30 to 1.0. Preferable examples of such groups include electron-withdrawing groups described later; in particular, $Z^1$ is preferably a $C_{2-12}$ acyl group, $C_{2-12}$ alkyloxycarbonyl group, nitro group, cyano group, $C_{1-12}$ alkylsulfonyl group, $C_{6-18}$ arylsulfonyl group, $C_{1-12}$ carbamoyl group and $C_{1-12}$ halogenated alkyl group, more preferably a cyano group, $C_{1-12}$ alkylsulfonyl group and $C_{6-18}$ arylsulfonyl group, and still more preferably a cyano group.

$R^1$ to $R^6$ in formula (3) have the same meanings as those of $R^1$ to $R^4$ defined in formula (1). $Z^2$ in formula (3) represents a hydrogen atom, aliphatic group or aromatic group.

Q in formula (3) represents a hydrogen atom, aliphatic group, aromatic group or heterocyclic group. In particular, Q is preferably a group consisting of non-metal atoms necessary to form a 5- to 8-memberred ring, and more preferably an aromatic group or heterocyclic group. The 5- to 8-memberred ring may have a substituent, may be a saturated ring or may have an unsaturated bond. The non-metal atom is preferably a nitrogen atom, oxygen atom, sulfur atom or carbon atom.

Preferable examples of the 5- to 8-memberred ring include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzimidazole ring, oxazole ring, benzoxazole ring, oxane ring, sulfolane ring and thian ring. When these groups further have substituent groups, the substituent groups are preferably those mentioned above for $R^1$ to $R^4$ in formula (3). Preferable structures of the dyes represented by formula (3) above are described in JP-A No. 2001-335714.

Among the dyes represented by formula (2) above, the magenta dyes are preferably the dyes represented by the following formula (4):

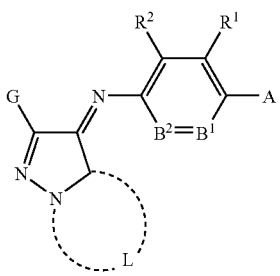

Formula (4)

In formula (4) shown above, G represents a hydrogen atom, aliphatic group, aromatic group, heterocyclic group, cyano group, alkoxy group, aryloxy group, alkylthio group, arylthio group, ester group, amino group, carbamoyl group, sulfonyl group, sulfamoyl group, ureido group, urethane group, acyl group, amide group or sulfonamide group. $R^1$, $R^2$, A, $B^1$ and $B^2$ have the same meanings as defined in formula (2) above, and preferable examples are also the same as in formula (2) above.

L represents an atomic group to form a 5- to 6-memberred nitrogen-containing heterocyclic ring, and the atomic group to form the nitrogen-containing heterocyclic ring may be substituted with at least one group selected from an aliphatic group, aromatic group, heterocyclic group, cyano group, alkoxy group, aryl group, oxy group, alkylthio group, arylthio group, ester group, amino group, carbamoyl group, sulfonyl group, sulfamoyl group, ureido group, urethane group, acyl group, amide group and sulfonamide group, or it may form a condensed ring with another ring.

In the dyes represented by formula (4), A is preferably —$NR^5R^6$, L is preferably an atomic group to form a 5-memberred nitrogen-containing heterocyclic ring, and preferable examples of the "5-memberred nitrogen-containing heterocyclic ring" include an imidazole ring, triazole ring, tetrazole ring, etc.

Among the compounds (dyes) represented by formula (1) or (2), suitable examples of the magenta dyes include Compounds (M-1 to M-70) described in Japanese Patent Application No. 2002-10361. However, the invention is not limited thereto. The compounds usable in the invention also include those described in JP-A Nos. 2001-240763, 2001-181549 and 2001-335714 in addition to the suitable examples mentioned above.

The dyes represented by formula (3) may be synthesized by following the methods described in, e.g., JP-A Nos. 2001-335714 and 55-161856. The dyes represented by formula (4) may be synthesized by following the methods described in, e.g., JP-A No. 4-126772, JP-B No. 7-94180 and JP-A No. 2001-240763.

Among the dyes represented by formula (2) shown above, the cyan dyes are preferably pyrrolotriazole azomethine dyes represented by the following formula (5):

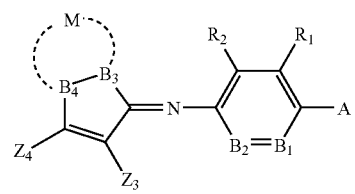

Formula (5)

In formula (5) shown above, $R^1$, $R^2$, A, $B^1$ and $B^2$ have the same meanings as defined in formula (2) above, and preferable examples are also the same as in formula (2) above. $Z^3$ and $Z^4$ each independently have the same meaning as G in formula (4) above. $Z^3$ and $Z^4$ may be bound to each other to form a cyclic structure.

M is an atomic group capable of forming a 1,2,4-triazole ring condensed with the 5-memberred ring of formula (5) above, wherein one of two atoms $B^3$ and $B^4$ is a nitrogen atom and the other is a carbon atom.

In the dyes (pyrrolotriazole azomethine dyes) represented by formula (5) shown above, $Z^3$ is an electron-withdrawing group having a Hammett's substituent constant $\sigma_p$ value of preferably 0.30 or more, more preferably 0.45 or more, and still more preferably 0.60 or more, so as to exhibit sharp absorption. The sum of Hammett's substituent constant $\sigma_p$ values of $Z^3$ and $Z^4$ is most preferably 0.70 or more, in view of an excellent cyan color hue.

The pyrrolotriazole azomethine dye represented by formula (5) shown above may also be used as a magenta dye by changing its substituent group, but it is used preferably as a cyan dye.

Hereinafter, the Hammett's substituent constant $\sigma_p$ value will be explained.

The Hammett's rule is an empirical rule proposed by L. P. Hammett in 1935 to quantitatively discuss the influence of substituent groups on the reaction or equilibrium of benzene derivatives, and currently validity of this rule is recognized. The substituent constant required in the Hammett's rule includes $\sigma_p$ value and $\sigma_m$ value, and these values can be found in many books, and are detailed in, for example, J. A. Dean: Lange's Handbook of Chemistry, 12th ed. (1979), McGraw-Hill, and Area of Chemistry (in Japanese), Extra Issue, No. 122, pp. 96-103 (1979), Nankodo.

As used herein, the respective substituent groups are limited and described by the Hammett's constant $\sigma_p$, but this does not mean that the substituent groups are limited to those having known values found in the above books, but means that the substituent groups also include those having Hammett's constant $\sigma_p$ values which when measured according to the Hammett's rule, are in the range defined in the invention even if their values are not known.

Non-benzene derivatives are also included in formulae (1) to (5), and as a criterion indicative of the electron effect of a substituent group, the $\sigma_p$ value is used regardless of the position of the substituent group. In the invention, therefore, the $\sigma_p$ value is used in this meaning.

The electron-withdrawing group having a Hammett's substituent constant $\sigma_p$ value of 0.60 or more includes a cyano group, nitro group, alkylsulfonyl group (for example, a methanesulfonyl group), an arylsulfonyl group (for example, a benzenesulfonyl group), etc.

The electron-withdrawing group having a Hammett's substituent constant $\sigma_p$ value of 0.45 or more includes those described above and an acyl group (for example, acetyl), an alkoxycarbonyl group (for example, dodecyloxycarbonyl), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl, N,N-dimethylsulfamoyl), a halogenated alkyl group (for example, trifluoromethyl), etc.

The electron-withdrawing group having a Hammett's substituent constant $\sigma_p$ value of 0.30 or more includes those described above and an acyloxy group (for example, acetoxy), a carbamoyl group (for example, N-ethylcarbamoyl, N,N-dibutylcarbamoyl), a halogenated alkoxy group (for example, trifluoromethyloxy), a halogenated aryloxy group (for example, pentafluorophenyloxy), a sulfonyloxy group (for example, a methylsulfonyloxy group), a halogenated alkylthio group (for example, difluoromethylthio), an aryl group substituted with two or more electron-withdrawing groups each having a Hammett's substituent constant $\sigma_p$ value of 0.15 or more (for example, 2,4-dinitrophenyl, pentachlorophenyl), and a heterocyclic ring (for example, 2-benzoxazolyl, 2-benzothiazolyl, 1-phenyl-2-benzimidazolyl), etc.

The electron-withdrawing group having a Hammett's substituent constant $\sigma_p$ value of 0.20 or more includes those described above and halogen atoms.

Among the pyrrolotriazole azomethine dyes represented by formula (5) shown above, exemplary compounds of the cyan dye include compounds (C-1 to C-9) described in Japanese Patent Application No. 2002-10361. However, the invention is not limited thereto. Exemplary compounds (dyes) described in JP-A No. 2001-181547 may also be used.

The yellow dye used as the oil-soluble dye is preferably a compound represented by formula (Y-I):

 Formula (Y-I)

In formula (Y-I) shown above, A and B each independently represent an optionally substituted heterocyclic group. The heterocyclic group is preferably a heterocyclic group composed of a 5- or 6-memberred ring, may be a monocyclic structure or a polycyclic structure having two or more rings condensed therein, and may be an aromatic or non-aromatic heterocyclic ring. A heteroatom constituting the heterocyclic ring is preferably a nitrogen atom, oxygen atom or sulfur atom.

In formula (Y-I), the heterocyclic ring represented by A is preferably 5-pyrazolone, pyrazole, oxazolone, isoxazolone, barbituric acid, pyridone, rhodanine, pyrazolidinedione, pyrazolopyridone, Meldrum's Acid or a condensed heterocyclic ring having a hydrocarbon aromatic ring or a heterocyclic ring condensed therewith. In particular, the heterocyclic ring is more preferably 5-pyrazolone, 5-aminopyrazole, pyridone or pyrazoloazole, and still more preferably 5-aminopyrazole, 2-hydroxy-6-pyridone or pyrazolotriazole.

The heterocyclic ring represented by B in formula (Y-I) is preferably pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzoisothiazole, thiadiazole, benzoisoxazole, pyrrolidine, piperidine, piperazine, imidazolidine or thiazoline. In particular, the heterocyclic ring is more preferably pyridine, quinoline, thiophene, benzothiophene, pyrazole, imidazole, benzimidazole, triazole, oxazole, isoxazole, benzoxazole, thiazole, benzothiazole, isothiazole, benzoisothiazole, thiadiazole or benzoisoxazole, still more preferably quinoline, thiophene, pyrazole, thiazole, benzoxazole, benzoisoxazole, isothiazole, imidazole, benzothiazole or thiadiazole, and further still more preferably pyrazole, benzothiazole, benzoxazole, imidazole, 1,2,4-thiadiazole or 1,3,4-thiadiazole.

Examples of substituent groups on A and B in formula (Y-I) include a halogen atom, alkyl group, cycloalkyl group, aralkyl group, alkenyl group, alkynyl group, aryl group, heterocyclic group, cyano group, hydroxyl group, nitro group, alkoxy group, aryloxy group, silyloxy group, heterocyclic oxy group, acyloxy group, carbamoyloxy group, alkoxycarbonyloxy group, aryloxycarbonyloxy, amino group, acylamino group, aminocarbonylamino group, alkoxycarbonylamino group, aryloxycarbonylamino group, sulfamoylamino group, alkyl and arylsulfonylamino group, mercapto group, alkylthio group, arylthio group, heterocyclic thio group, sulfamoyl group, alkyl and arylsulfinyl group, alkyl and arylsulfonyl group, acyl group, aryloxycarbonyl group, alkoxycarbonyl group, carbamoyl group, imide group, phosphino group, phosphinyl group, phosphinyloxy group, phosphinylamino group, and silyl group.

The dyes represented by formula (Y-I) are more preferably dyes represented by formulae (Y-II), (Y-III) and (Y-IV).

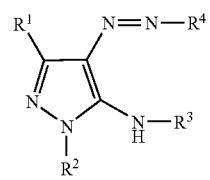

Formula (Y-II)

In formula (Y-II) shown above, $R^1$ and $R^3$ each independently represent a hydrogen atom, cyano group, alkyl group, cycloalkyl group, aralkyl group, alkoxy group, alkylthio group, arylthio group, aryl group or ionic hydrophilic group; $R^2$ represents a hydrogen atom, alkyl group, cycloalkyl group, aralkyl group, carbamoyl group, acyl group, aryl group or heterocyclic group; and $R^4$ represents a heterocyclic group.

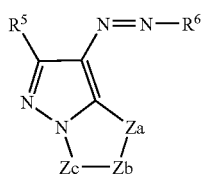

Formula (Y-III)

In formula (Y-III) shown above, $R^5$ represents a hydrogen atom, cyano group, alkyl group, cycloalkyl group, aralkyl group, alkoxy group, alkylthio group, arylthio group, aryl group or ionic hydrophilic group; $R^6$ represents a heterocyclic group; Za represents —N=, —NH— or $C(R^{11})$=; and Zb and Zc each independently represent —N= or $C(R^{11})$= in which $R^{11}$ represents a hydrogen atom or a non-metal substituent group.

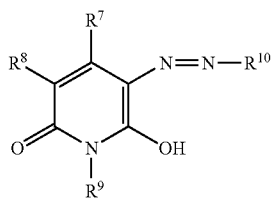

Formula (Y-IV)

In formula (Y-IV) shown above, $R^7$ and $R^9$ each independently represent a hydrogen atom, cyano group, alkyl group, cycloalkyl group, aralkyl group, aryl group, alkylthio group, arylthio group, alkoxycarbonyl group, carbamoyl group or ionic hydrophilic group; $R^8$ represents a hydrogen atom, halogen atom, alkyl group, alkoxy group, aryl group, aryloxy group, cyano group, acylamino group, sulfonylamino group, alkoxycarbonylamino group, ureido group, alkylthio group, arylthio group, alkoxycarbonyl group, carbamoyl group, sulfamoyl group, sulfonyl group, acyl group, alkylamino group, arylamino group, hydroxy group or ionic hydrophilic group; and $R^{10}$ represents a heterocyclic group.

Next, the substituent groups represented by $R^1$, $R^2$, $R^3$, $R^5$, $R^7$, $R^8$ or $R^9$ in formulae (Y-II), (Y-III) and (Y-IV) will be described in more detail.

The alkyl group represented by $R^1$, $R^2$, $R^3$, $R^5$, $R^7$, $R^8$ or $R^9$ in formulae (Y-II) to (Y-IV) includes an alkyl group having a substituent group and an unsubstituted alkyl group. The alkyl group is preferably a $C_{1-20}$ alkyl group, and when the alkyl group has a substituent group, examples of the substituent group include a hydroxyl group, alkoxy group, cyano group, halogen atom and ionic hydrophilic group. Preferable examples of the alkyl group include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl group represented by $R^1$, $R^2$, $R^3$, $R^5$, $R^7$, $R^8$ or $R^9$ in formulae (Y-II) to (Y-IV) includes a cycloalkyl group having a substituent group and an unsubstituted cycloalkyl group. The cycloalkyl group is preferably a $C_{5-12}$ cycloalkyl group, and when the cycloalkyl group has a substituent group, examples of the substituent group include an ionic hydrophilic group. Preferable examples of the cycloalkyl group include cyclohexyl.

The aralkyl group represented by $R^1$, $R^2$, $R^3$, $R^5$, $R^7$, $R^8$ or $R^9$ in formulae (Y-II) to (Y-IV) includes an aralkyl group having a substituent group and an unsubstituted aralkyl group. The aralkyl group is preferably a $C_{7-20}$ aralkyl group, and when the aralkyl group has a substituent group, examples of the substituent group include an ionic hydrophilic group. Preferable examples of the aralkyl group include benzyl and 2-phenethyl.

The aryl group represented by $R^1$, $R^2$, $R^3$, $R^5$, $R^7$, $R^8$ or $R^9$ in formulae (Y-II) to (Y-IV) includes an aryl group having a substituent group and an unsubstituted aryl group. The aryl group is preferably a $C_{6-20}$ aryl group, and when the aryl group has a substituent group, examples of the substituent group include an alkyl group, alkoxy group, halogen atom, alkylamino group and ionic hydrophilic group. Preferable examples of the aryl group include phenyl, p-tolyl, p-methoxyphenyl, o-chlorophenyl, and m-(3-sulfopropylamino) phenyl.

The alkylthio group represented by $R^1$, $R^2$, $R^3$, $R^5$, $R^7$, $R^8$ or $R^9$ in formulae (Y-II) to (Y-IV) includes an alkylthio group having a substituent group and an unsubstituted alkylthio group. The alkylthio group is preferably a $C_{1-20}$ alkylthio group, and when the alkylthio group has a substituent group, examples of the substituent group include an ionic hydrophilic group. Preferable examples of the alkylthio group include methylthio and ethylthio.

The arylthio group represented by $R^1$, $R^2$, $R^3$, $R^5$, $R^7$, $R^8$ or $R^9$ in formulae (Y-II) to (Y-IV) includes an arylthio group having a substituent group and an unsubstituted arylthio group. The arylthio group is preferably a $C_{6-20}$ arylthio group, and when the arylthio group has a substituent group, examples of the substituent group include an alkyl group and ionic hydrophilic group. Preferable examples of the arylthio group include phenylthio and p-tolylthio.

The heterocyclic group represented by $R^2$ in formula (Y-II) is preferably a 5- or 6-memberred heterocyclic ring which may further be condensed. The heteroatom constituting the heterocyclic ring is preferably a nitrogen atom, sulfur atom or oxygen atom. The heterocyclic group may be an aromatic or non-aromatic heterocyclic ring. The heterocyclic ring may be further substituted with a substituent group, and examples of the substituent group include the same substituent groups as on the aryl group described later. The heterocyclic ring is preferably a 6-memberred nitrogen-containing aromatic heterocyclic ring, and particularly preferably triazine, pyrimidine or phthalazine.

Preferable examples of the halogen atom represented by $R^8$ in formula (Y-IV) include a fluorine atom, chlorine atom and bromine atom.

The alkoxy group represented by $R^1$, $R^3$, $R^5$ or $R^8$ in formulae (Y-II) to (Y-IV) includes an alkoxy group having a substituent group and an unsubstituted alkoxy group. The alkoxy group is preferably a $C_{1-20}$ alkoxy group, and when the alkoxy group has a substituent group, examples of the substituent group include a hydroxyl group and ionic hydrophilic group. Preferable examples of the alkoxy group include methoxy, ethoxy, isopropoxy, methoxyethoxy, hydroxyethoxy, and 3-carboxypropoxy.

The aryloxy group represented by $R^8$ in formula (Y-IV) includes an aryloxy group having a substituent group and an unsubstituted aryloxy group. The aryloxy group is preferably a $C_{6-20}$ aryloxy group, and when the aryloxy group has a substituent group, examples of the substituent group include an alkoxy group and ionic hydrophilic group. Preferable examples of the aryloxy group include phenoxy, p-methoxyphenoxy and o-methoxyphenoxy.

The acylamino group represented by $R^8$ in formula (Y-IV) includes an acylamino group having a substituent group and an unsubstituted acylamino group. The acylamino group is preferably a $C_{2-20}$ acylamino group, and when the acylamino group has a substituent group, examples of the substituent group include an ionic hydrophilic group. Preferable examples of the acylamino group include acetamide, propionamide, benzamide and 3,5-disulfobenzamide.

The sulfonylamino group represented by $R^8$ in formula (Y-IV) includes a sulfonylamino group having a substituent group and an unsubstituted sulfonylamino group. The sulfonylamino group is preferably a $C_{1-20}$ sulfonylamino group, and more preferably methylsulfonylamino or ethylsulfonylamino.

The alkoxycarbonylamino group represented by $R^8$ in formula (Y-IV) includes an alkoxycarbonylamino group having a substituent group and an unsubstituted alkoxycarbonylamino group. The alkoxycarbonylamino group is preferably a $C_{2-20}$ alkoxycarbonylamino group, and when the alkoxycarbonylamino group has a substituent group, examples of the substituent group include an ionic hydrophilic group. Preferable examples of the alkoxycarbonylamino group include ethoxycarbonylamino.

The ureido group represented by $R^8$ in formula (Y-IV) includes an ureido group having a substituent group and an unsubstituted ureido group. The ureido group is preferably a $C_{1-20}$ ureido group, and when the ureido group has a substituent group, examples of the substituent group include an alkyl group and aryl group. Preferable examples of the ureido group include 3-methylureido, 3,3-dimethylureido and 3-phenylureido.

The alkoxycarbonyl group represented by $R^7$, $R^8$ or $R^9$ in formula (Y-IV) includes an alkoxycarbonyl group having a substituent group and an unsubstituted alkoxycarbonyl group. The alkoxycarbonyl group is preferably a $C_{2-20}$ alkoxycarbonyl group, and when the alkoxycarbonyl group has a substituent group, examples of the substituent group include an ionic hydrophilic group. Preferable examples of the alkoxycarbonyl group include methoxycarbonyl and ethoxycarbonyl.

The carbamoyl group represented by $R^2$, $R^7$, $R^8$ or $R^9$ in formula (Y-II) or (Y-IV) includes a carbamoyl group having a substituent group and an unsubstituted carbamoyl group. Examples of the substituent group include an alkyl group. Preferable examples of the carbamoyl group include a methylcarbamoyl group and dimethylcarbamoyl group.

The sulfamoyl group represented by $R^8$ in formula (Y-IV) includes a sulfamoyl group having a substituent group and an unsubstituted sulfamoyl group, and examples of the substituent group include an alkyl group. Preferable examples of the sulfamoyl group include a dimethylsulfamoyl group and di-(2-hydroxyethyl)sulfamoyl group.

Preferable examples of the sulfonyl group represented by $R^8$ in formula (Y-IV) include methanesulfonyl and phenylsulfonyl.

The acyl group represented by $R^2$ and $R^8$ in formula (Y-II) or (Y-IV) includes an acyl group having a substituent group and an unsubstituted acyl group. The acyl group is preferably a $C_{1-20}$ acyl group, and when the acyl group has a substituent group, examples of the substituent group include an ionic hydrophilic group. Preferable examples of the sulfonyl group include acetyl or benzoyl.

The alkyl amino group and the aryl amino group represented by $R^8$ in formula (Y-IV) include an amino group having a substituent group and an unsubstituted amino group, and when the amino group has a substituent group, examples of the substituent group include an alkyl group, aryl group and heterocyclic group. Preferable examples of the alkylamino group and arylamino group include methylamino, diethylamino, anilino and 2-chloroanilino.

The heterocyclic group represented by $R^4$, $R^6$ or $R^{10}$ in formulae (Y-II) to (Y-IV) is identical with the optionally substituted heterocyclic group represented by B in formula (Y-I) above, and preferable examples, more preferable examples and still more preferable examples thereof are identical with those described above. The substituent group includes an ionic hydrophilic group, $C_{1-12}$ alkyl group, aryl group, alkyl or arylthio group, halogen atom, cyano group, sulfamoyl group, sulfonamino group, carbamoyl group, and acylamino group, and the alkyl group and aryl group may further have a substituent group.

In formula (Y-III) above, Za represents $-N=$, $-NH-$ or $C(R^{11})=$; and Zb and Zc each independently represent $-N=$ or $C(R^{11})=$ in which $R^{11}$ represents a hydrogen atom or a non-metal substituent group. The non-metal substituent group represented by $R^{11}$ is preferably a cyano group, cycloalkyl group, aralkyl group, aryl group, alkylthio group, arylthio group or ionic hydrophilic group. These groups have the same meanings as those of the groups represented by $R^1$ in formula (Y-II), and preferable examples thereof are also identical with those described above.

Examples of the skeleton of the heterocyclic ring condensed with two 5-memberred rings contained in formula (Y-III) above are shown below.

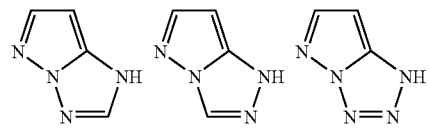

Each non-metal substituent group represented by $R^{11}$ may further have a substituent group, and when the group has a substituent group, examples of the substituent groups include the substituent groups which may be present on the heterocyclic ring represented by A or B in formula (Y-I).

Suitable examples of the dye represented by formula (Y-I) include compounds (Y-101 to Y-155) described in Japanese Patent Application No. 2002-10361, but the invention is not limited thereto. These compounds may be synthesized as set forth in JP-A Nos. 2-24191 and 2001-279145.

The oil-soluble dye relating to the invention is preferably a compound represented by the following formula (M-I) (hereinafter sometimes referred to as "azo dye"). Now, the compound represented by formula (M-I) is explained.

Formula (M-1)

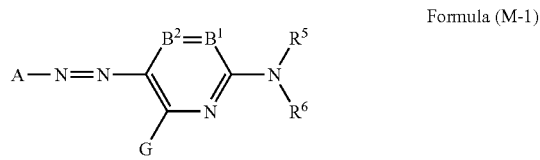

In formula (M-1) shown above, A represents a residue of a diazo component (A-NH$_2$) in the 5-memberred heterocyclic ring; $B^1$ represents $=CR^1-$ and $B^2$ represents $-CR^2=$, or alternatively, one of $B^1$ and $B^2$ represents a nitrogen atom and the other represents $=CR^1-$ or $-CR^2=$.

$R^5$ and $R^6$ in formula (M-I) each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each group may further have a substituent group.

G, $R^1$ and $R^2$ in formula (M-I) each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryloxycarbonylamino group, alkylarylsulfonylamino group, arylsulfonylamino group, aryloxycarbonylamino group, nitro group, alkylthio group, arylthio group, alkylsulfonyl group, arylsulfonyl group, alkylsulfinyl group, arylsulfinyl group, sulfamoyl group, sulfo group or heterocyclic thio group. Each group may be further substituted. $R^1$ and $R^5$, or $R^5$ and $R^6$, may be bound to each other to form a 5- or 6-memberred ring.

Then, the compound represented by formula (M-I) is explained in more detail.

In the "residue of a diazo component (A-NH$_2$) in the 5-memberred heterocyclic ring" represented by A in formula (M-I), examples of the heteroatom in the 5-memberred heterocyclic ring include N, O and S. The ring is preferably a nitrogen-containing 5-memberred heterocyclic ring with which an aliphatic ring, aromatic ring or another heterocyclic ring may be condensed. Preferable examples of the heterocyclic group for A include a pyrazole ring, imidazole ring, thiazole ring, isothiazole ring, thiadiazole ring, benzothiazole ring, benzoxazole ring and benzoisothiazole ring. Each heterocyclic group may further have a substituent group.

In particular, the pyrazol ring, imidazole ring, isothiazole ring, thiadiazole ring and benzothiazole ring represented by the following formulae (M-a) to (M-f) are preferable.

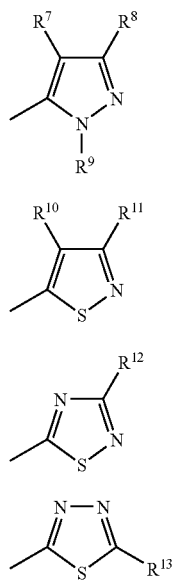

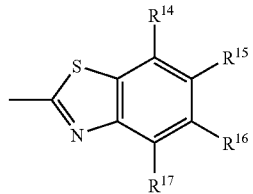

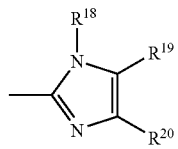

$R^7$ to $R^{20}$ in formulae (M-a) to (M-f) represent the same groups as G, $R^1$ and $R^2$ described later in formula (M-I).

The heterocyclic groups represented by formulae (M-a) to (M-f) are preferably a pyrazol ring and isothiazole ring represented by formulae (M-a) and (M-b), and most preferably a pyrazol ring represented by formula (M-a).

In formula (M-I), $B^1$ represents $=CR^1-$ and $B^2$ represents $-CR^1=$, or alternatively, one of $B^1$ and $B^2$ represents a nitrogen atom while the other represents $=CR^1-$ or $-CR^2=$. More preferably, $B^1$ represents $=CR^1-$ and $B^2$ represents $-CR^2=$.

The group represented by $R^5$ or $R^6$ is preferably a hydrogen atom, aliphatic group, aromatic group, heterocyclic group, acyl group, alkylsulfonyl group or arylsulfonyl group, and more preferably a hydrogen atom, aromatic group, heterocyclic group, acyl group, alkylsulfonyl group or arylsulfonyl group. The group represented by $R^1$ or $R^6$ is most preferably a hydrogen atom, aryl group or heterocyclic group. Each group may further have a substituent group. However, $R^5$ and $R^6$ do not simultaneously represent a hydrogen atom.

G, $R^1$ and $R^2$ each independently represent a hydrogen atom, halogen atom, aliphatic group, aromatic group, heterocyclic group, cyano group, carboxyl group, carbamoyl group, alkoxycarbonyl group, aryloxycarbonyl group, acyl group, hydroxy group, alkoxy group, aryloxy group, silyloxy group, acyloxy group, carbamoyloxy group, heterocyclic oxy group, alkoxycarbonyloxy group, aryloxycarbonyloxy group, amino group substituted with an alkyl group, aryl group or heterocyclic group, acylamino group, ureido group, sulfamoylamino group, alkoxycarbonylamino group, aryloxycarbonylamino group, alkylsulfonylamino group, arylsulfonylamino group, nitro group, alkylthio group, arylthio group, heterocyclic thio group, alkylsulfonyl group, arylsulfonyl group, alkylsulfinyl group, arylsulfinyl group, sulfamoyl group or sulfo group, and each group may further have a substituent group.

The group represented by G in formula (M-I) is preferably a hydrogen atom, halogen atom, aliphatic group, aromatic group, hydroxy group, alkoxy group, aryloxy group, acyloxy group, heterocyclic oxy group, amino group substituted with an alkyl group, aryl group or heterocyclic group, acylamino group, ureido group, sulfamoylamino group, alkoxycarbonylamino group, aryloxycarbonylamino group, alkylthio group, arylthio group and heterocyclic thio group, more preferably a hydrogen atom, halogen atom, alkyl group, hydroxy group, alkoxy group, aryloxy group, acyloxy group, amino group substituted with an alkyl group, aryl group or heterocyclic group, or acylamino group, and most preferably a hydrogen atom, arylamino group or amide group. Each group may further have a substituent group.

Preferable examples of groups represented by $R^1$ and $R^2$ constituting $B^1$ and $B^2$ in formula (M-I) include a hydrogen atom, alkyl group, alkoxycarbonyl group, carboxyl group, carbamoyl group and cyano group. Each group may further have a substituent group.

In formula (M-I), $R^1$ and $R^5$, or $R^5$ and $R^6$, may be bound to each other to form a 5- to 6-memberred ring. When each group represented by A, $R^1$, $R^2$, $R^5$, $R^6$ or G in formula (M-I) further has a substituent group, the substituent group includes the substituent groups as defined for G, $R^1$, and $R^2$ indicated above.

Now, the groups represented by G, $R^1$ or $R^2$ will be explained in more detail.

The halogen atom represented by G, $R^1$ or $R^2$ in formula (M-I) includes a fluorine atom, chlorine atom and bromine atom.

The aliphatic group represented by G, $R^1$ or $R^2$ in formula (M-I) includes an alkyl group, substituted alkyl group, alkenyl group, substituted alkenyl group, alkynyl group, substituted alkynyl group, aralkyl group and substituted aralkyl group. The aliphatic group may be branched or may form a ring. The number of carbon atoms in the aliphatic group is preferably 1 to 20, and more preferably 1 to 16. The aryl moiety of the aralkyl group and substituted aralkyl group is preferably phenyl or naphthyl, and more preferably phenyl. Examples of the aliphatic group include a methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group and allyl group.

As used herein, the aromatic group refers to an aryl group and a substituted aryl group. The aryl group is preferably a phenyl or naphthyl group, and more preferably a phenyl group. The number of carbon groups in the aromatic group represented by G, $R^1$ or $R^2$ in formula (M-I) is preferably 6 to 20, and more preferably 6 to 16. Preferable examples of the aromatic group include a phenyl group, p-tolyl group, p-methoxyphenyl group, o-chlorophenyl group and m-(3-sulfopropylamino)phenyl group.

The heterocyclic group represented by G, $R^1$ or $R^2$ in formula (M-I) includes a heterocyclic group having a substituent group and an unsubstituted heterocyclic group. An aliphatic group, an aromatic ring or another heterocyclic ring may be condensed with the heterocyclic ring. The heterocyclic group is preferably a 5- or 6-memberred heterocyclic group. Examples of the substituent group include an aliphatic group, halogen atom, alkylsulfonyl group, arylsulfonyl group, acyl group, acylamino group, sulfamoyl group, carbamoyl group and ionic hydrophilic group. Examples of the heterocyclic group include a 2-pyridyl group, 2-thienyl group, 2-thiazolyl group, 2-benzothiazolyl group, 2-benzoxazolyl group and 2-furyl group.

Examples of the alkylsulfonyl group and arylsulfonyl group represented by G, $R^1$ or $R^2$ in formula (M-I) include a methanesulfonyl group and phenylsulfonyl group, respectively.

Examples of the alkylsulfinyl group and arylsulfinyl group represented by G, $R^1$ or $R^2$ in formula (M-I) include a methanesulfinyl group and phenylsulfinyl group, respectively.

The acyl group represented by G, $R^1$ or $R^2$ in formula (M-I) includes an acyl group having a substituent group and an unsubstituted acyl group. The acyl group is preferably a $C_{1-12}$ acyl group. Examples of the substituent group include an ionic hydrophilic group. Examples of the acyl group include an acetyl group and benzoyl group.

The amino group represented by G, $R^1$ or $R^2$ in formula (M-I) includes amino groups substituted with an alkyl group, aryl group and heterocyclic group, and the alkyl group, aryl group and heterocyclic group may further have substituent groups. The amino group does not include an unsubstituted amino group.

The alkylamino group is preferably a $C_{1-6}$ alkylamino group. When the alkylamino group further has a substituent group, examples of the substituent group include an ionic hydrophilic group. Examples of the alkylamino group include a methylamino group and diethylamino group.

The arylamino group includes an arylamino group having a substituent group and an unsubstituted arylamino group. The arylamino group is preferably a $C_{6-12}$ arylamino group. When the arylamino group further has a substituent group, examples of the substituent group include a halogen atom and ionic hydrophilic group. Examples of the arylamino group include an anilino group and 2-chloroanilino group.

The alkoxy group represented by G, $R^1$ or $R^2$ in formula (M-I) includes an alkoxy group having a substituent group and an unsubstituted alkoxy group. The alkoxy group is preferably a $C_{1-12}$ alkoxy group. When the alkoxy group has a substituent group, examples of the substituent group include an alkoxy group, hydroxyl group and ionic hydrophilic group. Examples of the alkoxy group include a methoxy group, ethoxy group, isopropoxy group, methoxyethoxy group, hydroxyethoxy group and 3-carboxypropoxy group.

The aryloxy group represented by G, $R^1$ or $R^2$ in formula (M-I) includes an aryloxy group having a substituent group and an unsubstituted aryloxy group. The aryloxy group is preferably a $C_{6-12}$ aryloxy group. When the aryloxy group has a substituent group, examples of the substituent group include an alkoxy group and ionic hydrophilic group. Examples of the aryloxy group include a phenoxy group, p-methoxyphenoxy group and o-methoxyphenoxy group.

The acylamino group represented by G, $R^1$ or $R^2$ in formula (M-I) includes an acylamino group having a substituent group. The acylamino group is preferably a $C_{2-12}$ acylamino group. When the acylamino group has a substituent group, examples of the substituent group include an ionic hydrophilic group. Examples of the acylamino group include an acetylamino group, propionylamino group, benzoylamino group, N-phenylacetylamino and 3,5-disulfobenzoylamino group.

The ureido group represented by G, $R^1$ or $R^2$ in formula (M-I) includes an ureido group having a substituent group and an unsubstituted ureido group. The ureido group is preferably a $C_{1-12}$ ureido group. When the ureido group has a substituent group, examples of the substituent group include an alkyl group and aryl group. Examples of the ureido group include a 3-methylureido group, 3,3-dimethylureido group and 3-phenylureido group.

The sulfamoylamino group represented by G, $R^1$ or $R^2$ in formula (M-I) includes a sulfamoylamino group having a substituent group and an unsubstituted sulfamoylamino group. When the sulfamoyl group has a substituent group, examples of the substituent group include an alkyl group. Examples of the sulfamoylamino group include an N,N-dipropylsulfamoylamino group.

The alkoxycarbonylamino group represented by G, $R^1$ or $R^2$ in formula (M-I) includes an alkoxycarbonylamino group having a substituent group and an unsubstituted alkoxycarbonylamino group. The alkoxycarbonylamino group is preferably a $C_{2-12}$ alkoxycarbonylamino group. When the alkoxycarbonylamino group has a substituent group, examples of the substituent group include an ionic hydrophilic group. Examples of the alkoxycarbonylamino group include an ethoxycarbonylamino group.

The alkylsulfonylamino group and arylsulfonylamino group represented by G, $R^1$ or $R^2$ in formula (M-I) include alkyl and arylsulfonylamino groups having a substituent group, and unsubstituted alkyl and arylsulfonylamino groups. The alkyl and arylsulfonylamino groups are preferably $C_{1-12}$ alkyl and arylsulfonylamino groups. When the alkyl and arylsulfonylamino groups have a substituent group, examples of the substituent group include an ionic hydrophilic group. Examples of the alkyl and arylsulfonylamino groups include a methanesulfonylamino group, N-phenylmethanesulfonylamino group, benzenesulfonylamino group, and 3-carboxybenzenesulfonylamino group.

The carbamoyl group represented by G, $R^1$ or $R^2$ in formula (M-I) includes a carbamoyl group having a substituent group and an unsubstituted carbamoyl group. When the carbamoyl group has a substituent group, examples of the substituent group include an alkyl group. Examples of the carbamoyl group include a methylcarbamoyl group and dimethylcarbamoyl group.

The sulfamoyl group represented by G, $R^1$ or $R^2$ in formula (M-I) includes a sulfamoyl group having a substituent group and an unsubstituted sulfamoyl group. When the sulfamoyl group has a substituent group, examples of the substituent group include an alkyl group. Examples of the sulfamoyl group include a dimethylsulfamoyl group and di-(2-hydroxyethyl)sulfamoyl group.

The alkoxycarbonyl group represented by G, $R^1$ or $R^2$ in formula (M-I) includes an alkoxycarbonyl group having a substituent group and an unsubstituted alkoxycarbonyl group. The alkoxycarbonyl group is preferably a $C_{2-12}$ alkoxycarbonyl group. When the alkoxycarbonyl group has a substituent group, examples of the substituent group include an ionic hydrophilic group. Examples of the alkoxycarbonyl group include a methoxycarbonyl group and ethoxycarbonyl group.

The acyloxy group represented by G, $R^1$ or $R^2$ in formula (M-I) includes an acyloxy group having a substituent group and an unsubstituted acyloxy group. The acyloxy group is preferably a $C_{1-12}$ acyloxy group. When the acyloxy group has a substituent group, examples of the substituent group include an ionic hydrophilic group. Examples of the acyloxy group include an acetoxy group and benzoyloxy group.

The carbamoyloxy group represented by G, $R^1$ or $R^2$ in formula (M-I) includes a carbamoyloxy group having a substituent group and an unsubstituted carbamoyloxy group. When the carbamoyloxy group has a substituent group, examples of the substituent group include an alkyl group. Examples of the carbamoyloxy group include an N-methylcarbamoyloxy group.

The aryloxycarbonyl group represented by G, $R^1$ or $R^2$ in formula (M-I) includes an aryloxycarbonyl group having a substituent group and an unsubstituted aryloxycarbonyl group. The aryloxycarbonyl group is preferably a $C_{7-12}$ aryloxycarbonyl group. When the aryloxycarbonyl group has a substituent group, examples of the substituent group include an ionic hydrophilic group. Examples of the aryloxycarbonyl group include a phenoxycarbonyl group.

The aryloxycarbonylamino group represented by G, $R^1$ or $R^2$ in formula (M-I) includes an aryloxycarbonylamino group having a substituent group and an unsubstituted aryloxycarbonylamino group. The aryloxycarbonylamino group is preferably a $C_{7-12}$ aryloxycarbonylamino group. When the aryloxycarbonylamino group has a substituent group, examples of the substituent group include an ionic hydrophilic group. Examples of the aryloxycarbonylamino group include a phenoxycarbonylamino group.

The alkylthio group, arylthio group and heterocyclic thio group represented by G, $R^1$ or $R^2$ in formula (M-I) include an alkylthio group, arylthio group and heterocyclic thio group each having a substituent group and an unsubstituted alkylthio group, arylthio group and heterocyclic thio group. The alkylthio group, arylthio and heterocyclic thio group are preferably those each having 1 to 12 carbon atoms. When the group has a substituent group, examples of the substituent group include an ionic hydrophilic group. Examples of the alkylthio, arylthio and heterocyclic thio group include a methylthio group, phenylthio group and 2-pyridylthio group.

The azo dye in the invention is particularly preferably a compound represented by formula (M-II):

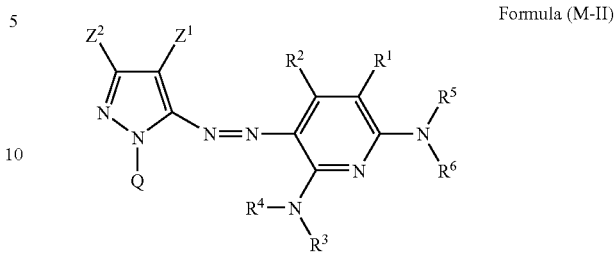

Formula (M-II)

In formula (M-II), $Z^1$ represents an electron-withdrawing group having a Hammett's substituent constant $\sigma_p$ value of 0.20 or more. $Z^1$ is preferably an electron-withdrawing group having a $\sigma_p$ value of 0.30 to 1.0. Preferable examples of the substituent group include electron-withdrawing substituent groups described later; in particular, $Z^1$ is preferably a $C_{2-12}$ acyl group, $C_{2-12}$ alkyloxycarbonyl group, nitro group, cyano group, $C_{1-12}$ alkylsulfonyl group, $C_{6-18}$ arylsulfonyl group, $C_{1-12}$ carbamoyl group or $C_{1-12}$ halogenated alkyl group, more preferably a cyano group, $C_{1-12}$ alkylsulfonyl group or $C_{6-18}$ arylsulfonyl group, and most preferably a cyano group.

$R^1$, $R^2$, $R^5$ and $R^6$ in formula (M-II) have the same meanings as for $R^1$, $R^2$, $R^5$ and $R^6$ defined in formula (M-I) above.

$R^3$ and $R^4$ in formula (M-II) each independently represent a hydrogen atom, aliphatic group, aromatic group, heterocyclic group, acyl group, alkoxycarbonyl group, aryloxycarbonyl group, carbamoyl group, alkylsulfonyl group, arylsulfonyl group or sulfamoyl group. Each of $R^3$ and $R^4$ is more preferably a hydrogen atom, aromatic group, heterocyclic group, acyl group, alkylsulfonyl group or arylsulfonyl group, and more preferably a hydrogen atom, aromatic group or heterocyclic group.

$Z^2$ in formula (M-II) represents a hydrogen atom, aliphatic group, aromatic group or heterocyclic group.

Q in formula (M-II) represents a hydrogen atom, aliphatic group, aromatic group or heterocyclic group. In particular, Q is preferably a group consisting of non-metal atoms necessary to form a 5- to 8-memberred ring. The 5- to 8-memberred ring may be substituted, may be a saturated ring or may have an unsaturated bond. In particular, the 5- to 8-memberred ring is preferably an aromatic group or heterocyclic group. The non-metal atom is preferably a nitrogen atom, oxygen atom, sulfur atom or carbon atom. Preferable examples of the 5- to 8-memberred ring include a benzene ring, cyclopentane ring, cyclohexane ring, cycloheptane ring, cyclooctane ring, cyclohexene ring, pyridine ring, pyrimidine ring, pyrazine ring, pyridazine ring, triazine ring, imidazole ring, benzimidazole ring, oxazole ring, benzoxazole ring, thiazole ring, benzothiazole ring, oxane ring, sulfolane ring and thian ring.

The respective groups described in formula (M-II) above may further have substituent groups. When these groups further have substituent groups, the substituent groups include those indicated in formula (M-I) above and the groups and ionic hydrophilic groups mentioned for G, $R^1$ and $R^2$ above.

In connection with the substituent group $Z^1$ in formula (M-II), the Hammett's substituent constant $\sigma_p$ value as used herein is explained. The Hammett's rule is as described above, and non-benzene derivatives are also included in formulae (M-I) and (M-II) in the invention, but as a criterion indicative of the electron effect of a substituent group, the $\sigma_p$ value is used regardless of the position of the substituent group. In the invention, the $\sigma_p$ value is used in this meaning. Examples of the electron-withdrawing group having a Hammett's substituent constant $\sigma_p$ value of 0.60 or more, 0.45 or more, 0.30 or more and 0.20 or more are described supra.

Particularly preferable combinations of $R^5$, $R^6$, A, $B^1$, $B^2$ and G in the compound represented by formula (M-I) are as follows:

(A) Each of $R^5$ and $R^6$ is preferably a hydrogen atom, alkyl group, aryl group, heterocyclic group, sulfonyl group or acyl group, more preferably a hydrogen atom, aryl group, heterocyclic group or sulfonyl group, and most preferably a hydrogen atom, aryl group or heterocyclic group. However, $R^5$ and $R^6$ do not simultaneously represent a hydrogen atom.

(B) G is preferably a hydrogen atom, halogen atom, alkyl group, hydroxyl group, amino group or amide group, more preferably a hydrogen atom, halogen atom, amino group or amide group, and most preferably a hydrogen atom, amino group or amide group.

(C) A is preferably a pyrazole ring, imidazole ring, isothiazole ring, thiadiazole ring or benzothiazole ring, more preferably a pyrazole ring or isothiazole ring, and most preferably a pyrazole ring.

(D) Each of $B^1$ and $B^2$ is =$CR^1$— or —$CR^2$=, and each of $R^1$ and $R^2$ is preferably a hydrogen atom, halogen atom, cyano group, carbamoyl group, carboxyl group, alkyl group, hydroxyl group or alkoxy group, and more preferably a hydrogen atom, cyano group, carbamoyl group or alkoxy group.

The compounds represented by formula (M-I) are preferably the compounds wherein at least one, preferably two or more, more preferably all of $R^5$, $R^6$, A, $B^1$, $B^2$ and G are the preferable groups described in Items (A) to (D) above.

Exemplary compounds represented by formula (M-I) shown above include, but are not limited to, compounds (a-1 to a-27, b-1 to b-6, c-1 to c-3, d-1 to d-4, e-1 to e-4) shown in Japanese Patent Application No. 2002-10361.

The oil-soluble dye in the invention is preferably a compound represented by formula (C-I) shown below (hereinafter sometimes referred to as "phthalocyanine dye"). Now, the compound represented by formula (C-I) is described.

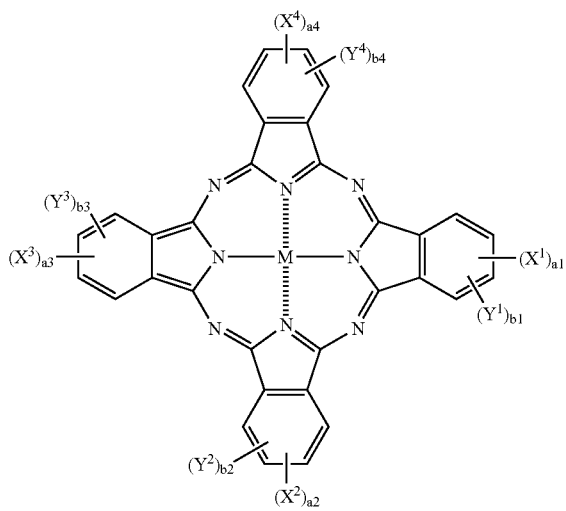

Formula (C-I)

In formula (C-I), $X^1$, $X^2$, $X^3$ and $X^4$ each independently represent —SO—$Z^1$, —$SO_2$—$Z^1$ or —$SO_2NR^{21}R^{22}$. $Z^1$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, more preferably a substituted or unsubstituted alkyl group, a substituted or unsubstituted aryl group, or a substituted or unsubstituted heterocyclic group, and most preferably a substituted alkyl group, a substituted aryl group and a substituted heterocyclic group.

$R^{21}$ and $R^{22}$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, more preferably a hydrogen atom, a substituted or unsubstituted alkyl group, a substituted or unsubstituted aryl group, or a substituted or unsubstituted heterocyclic group, and most preferably a hydrogen atom, a substituted alkyl group, a substituted aryl group and a substituted heterocyclic group. However, $R^{21}$ and $R^{22}$ do not simultaneously represent a hydrogen atom.

The substituted or unsubstituted alkyl group represented by $R^{21}$, $R^{22}$ or $Z^1$ in formula (C-I) is preferably a $C_{1-30}$ alkyl group. Examples of the substituent group include substituent groups described later which can be possessed by $Z^1$, $R^{21}$, $R^{22}$, $Y^1$, $Y^2$, $Y^3$ and $Y^4$. Among these, a hydroxyl group, alkoxy group, cyano group and halogen atom are preferable.

The substituted or unsubstituted cycloalkyl group represented by $R^{21}$, $R^{22}$ or $Z^1$ in formula (C-I) is preferably a $C_{5-30}$ cycloalkyl group. Examples of the substituent group include substituent groups described later which can be possessed by $Z^1$, $R^{21}$, $R^{22}$, $Y^1$, $Y^2$, $Y^3$ and $Y^4$. Among these, a hydroxyl group, alkoxy group, cyano group and halogen atom are preferable.

The substituted or unsubstituted alkenyl group represented by $R^{21}$, $R^{22}$ or $Z^1$ in formula (C-I) is preferably a $C_{2-30}$ alkenyl group. Examples of the substituent group include substituent groups described later which can be possessed by $Z^1$, $R^{21}$, $R^{22}$, $Y^1$, $Y^2$, $Y^3$ and $Y^4$. Among these, a hydroxyl group, alkoxy group, cyano group and halogen atom are preferable.

The substituted or unsubstituted aralkyl group represented by $R^{21}$, $R^{22}$ or $Z^1$ in formula (C-I) is preferably a $C_{7-30}$ aralkyl group. Examples of the substituent group include substituent groups described later which can be possessed by $Z^1$, $R^{21}$, $R^{22}$, $Y^1$, $Y^2$, $Y^3$ and $Y^4$. Among these, a hydroxyl group, alkoxy group, cyano group and halogen atom are preferable.

Substituent groups on the aryl group represented by $R^{21}$, $R^{22}$ or $Z^1$ in formula (C-I) include substituent groups described later which can be possessed by $Z^1$, $R^{21}$ $R^{22}$, $Y^1$, $Y^2$, $Y^3$ and $Y^4$. The substituent group is preferably a halogen atom, heterocyclic group, cyano group, hydroxyl group, nitro group, carboxyl group, acylamino group, ureido group, sulfamoylamino group, alkyloxycarbonyl group, alkyloxycarbonylamino group, sulfonamide group, sulfamoyl group, carbamoyl group, sulfonyl group, acyloxy group, carbamoyloxy group, imide group, heterocyclic thio group, acyl group, sulfo group or quaternary ammonium group, more preferably a heterocyclic group, cyano group, carboxyl group, acylamino group, sulfonamide group, sulfamoyl group, carbamoyl group, sulfonyl group, imide group or acyl group, still more preferably a cyano group, carboxyl group, sulfamoyl group, carbamoyl group, sulfonyl group, imide group or acyl group.

The heterocyclic group represented by $R^{21}$, $R^{22}$ or $Z^1$ in formula (C-I) is preferably a 5- or 6-memberred ring which may be further condensed. The heterocyclic group may be an aromatic or a non-aromatic heterocyclic ring.

Now, the heterocyclic group represented by $R^{21}$, $R^{22}$ or $Z^1$ in formula (C-I) is exemplified in the form of a heterocyclic ring without specifying the positions of substituent groups. The positions of the substituent groups are not limited, and as an example, pyridine can be substituted at the 2-, 3- and 4-positions. Mention is made of pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isoxazole, benzoisoxazole, pyrrolidine, piperidine, piperazine, imidazolidine and thiazoline. Among those described above, the aromatic heterocyclic group is preferable, and preferable examples thereof include pyridine, pyrazine, pyrimidine, pyridazine, triazine, pyrazole, imidazole, benzimidazole, triazole, thiazole, benzothiazole, isothiazole, benzisothiazole and thiadiazole. These may have substituent groups.

$Y^1$, $Y^2$, $Y^3$ and $Y^4$ in formula (C-I) each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, amide group, arylamino group, ureido group, sulfamoylamino group, alkylthiol group, arylthio group, alkoxycarbonylamino group, sulfonamide group, carbamoyl group, sulfamoyl group, sulfonyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group, each of which may further have a substituent group.

Each of $Y^1$, $Y^2$, $Y^3$ and $Y^4$ is more preferably a hydrogen atom, halogen atom, alkyl group, aryl group, cyano group, alkoxy group, amide group, ureido group, sulfonamide group, carbamoyl group, sulfamoyl group or alkoxycarbonyl group, still more preferably a hydrogen atom, halogen atom or cyano group, and most preferably a hydrogen atom.

When $Z^1$, $R^{21}$, $R^{22}$, $Y^1$, $Y^2$, $Y^3$ and $Y^4$ in formula (C-I) is a group which can further have a substituent group, it may further have a substituent group shown below. That is, the substituent group includes a halogen atom (for example, a chlorine atom, bromine atom), a $C_{1-30}$ linear or branched alkyl group, a $C_{7-30}$ aralkyl group, a $C_{2-30}$ alkenyl group, a $C_{2-30}$ linear or branched alkynyl group, a $C_{2-30}$ linear or branched cycloalkyl group and a $C_{3-30}$ linear or branched cycloalkenyl group (for example, methyl, ethyl, propyl, isopropyl, t-butyl, 2-methanesulfonylethyl, 3-phenoxypropyl, trifluoromethyl and cyclopentyl), an aryl group (for example, phenyl, 4-t-butylphenyl, 2,4-di-t-amylphenyl), a heterocyclic group (for example, imidazolyl, pyrazolyl, triazolyl, 2-furyl, 2-thienyl, 2-pyrimidinyl, 2-benzothiazolyl), a cyano group, hydroxyl group, nitro group, carboxy group, amino group, alkyloxy group (for example, methoxy, ethoxy, 2-methoxyethoxy, 2-methanesulfonylethoxy), an aryloxy group (for example, phenoxy, 2-methylphenoxy, 4-t-butylphenoxy, 3-nitrophenoxy, 3-t-butyloxycarbamoylphenoxy, 3-methoxycarbamoyl), an acylamino group (for example, acetamide, benzamide, 4-(3-t-butyl-4-hydroxyphenoxy)butanamide), an alkylamino group (for example, methylamino, butylamino, diethylamino, methylbutylamino), an anilino group (for example, phenylamino, 2-chloroanilino), an ureido group (for example, phenylureido, methylureido, N,N-dibutylureido), a sulfamoylamino group (for example, N,N-dipropylsulfamoylamino), an alkylthio group (for example, methylthio, octylthio, 2-phenoxyethylthio), an arylthio group (for example, phenylthio, 2-butoxy-5-t-octylphenylthio, 2-carboxyphenylthio), an alkyloxycarbonylamino group (for example, methoxycarbonylamino), a sulfonamide group (for example, methanesulfonamide, benzenesulfonamide, p-toluenesulfonamide), a carbamoyl group (for example, N-ethylcarbamoyl, N,N-dibutylcarbamoyl), a sulfamoyl group (for example, N-ethylsulfamoyl, N,N-dipropylsulfamoyl, N-phenylsulfamoyl), a sulfonyl group (for example, methanesulfonyl, octanesulfonyl, benzenesulfonyl, toluenesulfonyl), an alkyloxycarbonyl group (for example, methoxycarbonyl, butyloxycarbonyl), a heterocyclic oxy group (for example, 1-phenyltetrazol-5-oxy, 2-tetrahydropyranyloxy), an azo group (for example, phenylazo, 4-methoxyphenylazo, 4-pivaloylaminophenylazo, 2-hydroxy-4-propanoylphenylazo), an acyloxy group (for example, acetoxy), a carbamoyloxy group (for example, N-methylcarbamoyloxy, N-phenylcarbamoyloxy), a silyloxy group (for example, trimethylsilyloxy, dibutylmethylsilyloxy), an aryloxycarbonylamino group (for example, phenoxycarbonylamino), an imide group (for example, N-succinimide, N-phthalimide), a heterocyclic thio group (for example, 2-benzothiazolylthio, 2,4-di-phenoxy-1,3,5-triazole-6-thio, 2-pyridylthio), a sulfinyl group (for example, 3-phenoxypropylsulfinyl), a phosphonyl group (for example, phenoxyphosphonyl, octyloxyphosphonyl, phenylphosphonyl), an aryloxycarbonyl group (for example, phenoxycarbonyl), an acyl group (for example, acetyl, 3-phenylpropanoyl, benzoyl), an ionic hydrophilic group (for example, a carboxyl group, sulfo group and quaternary ammonium group), etc.

a1 to a4 and b1 to b4 represent the number of X1 to X4 and Y1 to Y4 substituent groups, respectively; a1 to a4 each independently represent an integer of 0 to 4; and b1 to b4 each independently represent an integer of 0 to 4. However, the sum of a1 to a4 is 2 or more. When a1 to a4 and b1 to b4 each represent an integer of 2 or more, the respective X1 to X4 and Y1 to Y4 groups may be the same or different.

a1 and b1 each independently represent an integer of 0 to 4 satisfying the relationship a1+b1=4, and it is particularly preferable that a1 is 1 and b1 is 3, or a1 is 2 and b1 is 2, and it is most preferable that a1 is 1 and b1 is 3.

a2 and b2 each independently represent an integer of 0 to 4 satisfying the relationship a2+b2=4, and it is particularly preferable that a2 is 1 and b2 is 3, or a2 is 2 and b2 is 2, and it is most preferable that a2 is 1 and b2 is 3.

a3 and b3 each independently represent an integer of 0 to 4 satisfying the relationship a3+b3=4, and it is particularly preferable that a3 is 1 and b3 is 3, or a3 is 2 and b3 is 2, and it is most preferable that a3 is 1 and b3 is 3.

a4 and b4 each independently represent an integer of 0 to 4 satisfying the relationship a4+b4=4, and it is particularly preferable that a4 is 1 and b4 is 3, or a4 is 2 and b4 is 2, and it is most preferable that a4 is 1 and b4 is 3.

M represents a hydrogen atom, a metal element or an oxide, hydroxide or halide thereof. Preferable examples of M include a hydrogen atom and metal atoms such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi. The oxide includes VO, GeO, etc. The hydroxide includes $Si(OH)_2$, $Cr(OH)_2$, $Sn(OH)_2$, etc. The halide includes $AlCl$, $SiCl_2$, $VCl$, $VCl_2$, $VOCl$, $FeCl$, $GaCl$ and $ZrCl$. Among these, Cu, Ni, Zn, Al, etc. are preferable, and Cu is most preferable.

Further, Pc (phthalocyanine ring) may form a dimer (for example, Pc-M-L-M-Pc) or a trimer via L (divalent linking group) wherein M residues may be the same or different.

The divalent linking group represented by L is preferably an oxy group (—O—), thio group (—S—), carbonyl group (—CO—), sulfonyl group (—SO$_2$—), imino group (—NH—) or methylene group (—CH$_2$—).

A particularly preferable combination of groups in the compound represented by formula (C-I) is as follows:

Each of $X^1$ to $X^4$ is particularly preferably —$SO_2$—$Z^1$ or —$SO_2NR^{21}R^{22}$. $Z^1$ is preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. Each of $R^{21}$ and $R^{22}$ is preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. Each of $Y^1$ to $Y^4$ is preferably a hydrogen atom, halogen atom, alkyl group, aryl group, cyano group, alkoxy group, amide group, ureido group, sulfonamide group, carbamoyl group, sulfamoyl group, alkoxycarbonyl group, carboxyl group or sulfo group, more preferably a hydrogen atom, halogen atom, cyano group, carboxyl group or sulfo group, and most preferably a hydrogen atom. Each of a1 to a4 is preferably 1 or 2, and particularly preferably 1. Each of b1 to b4 is preferably 3 or 2, and particularly preferably 3. M is a hydrogen atom, a metal element or an oxide, hydroxide or halide thereof, more preferably Cu, Ni, Zn or Al, and most preferably Cu.

The compound represented by formula (C-I) is a compound wherein preferably at least one substituent group, more preferably two or more substituent groups, most preferably all substituent groups are the preferable groups described above.

The compound represented by formula (C-I) is more preferably a compound represented by formula (C-II):

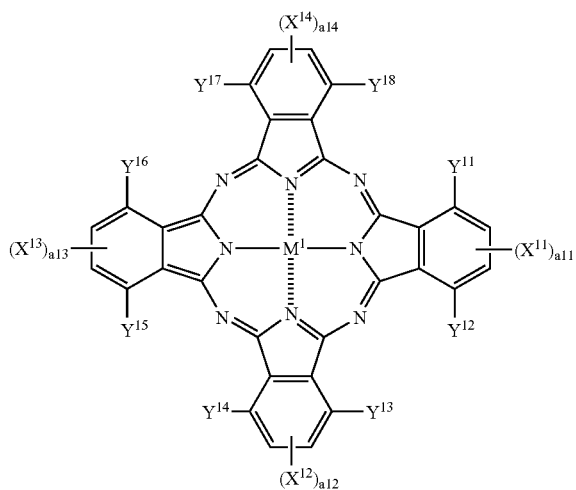

Formula (C-II)

In formula (C-II) shown above, $X^{11}$ to $X^{14}$ and $Y^{11}$ to $Y^{18}$ have the same meanings as those of $X^1$ to $X^4$ and $Y^1$ to $Y^4$ in formula (C-I), respectively, and preferable examples of these groups are also the same as defined above. $M^1$ has the same meaning as that of M in formula (C-I), and preferable examples thereof are also the same as defined above.

Specifically, $X^{11}$, $X^{12}$, $X^{13}$ and $X^{14}$ in formula (C-II) each independently represent —SO—$Z^{11}$, —$SO_2$—$Z^{11}$ or —$SO_2NR^{23}R^{24}$. $Z^{11}$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R^{23}$ represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and $R^{24}$ represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

$Y^{11}$, $Y^{12}$, $Y^{13}$, $Y^{14}$, $Y^{15}$, $Y^{16}$, $Y^{17}$ and $Y^{18}$ in formula (C-II) each independently represent a hydrogen atom, halogen atom, alkyl group, cycloalkyl group, alkenyl group, aralkyl group, aryl group, heterocyclic group, cyano group, hydroxyl group, nitro group, amino group, alkylamino group, alkoxy group, aryloxy group, amide group, arylamino group, ureido group, sulfamoylamino group, alkylthiol group, arylthio group, alkoxycarbonylamino group, sulfonamide group, carbamoyl group, alkoxycarbonyl group, heterocyclic oxy group, azo group, acyloxy group, carbamoyloxy group, silyloxy group, aryloxycarbonyl group, aryloxycarbonylamino group, imide group, heterocyclic thio group, phosphoryl group, acyl group, carboxyl group or sulfo group, each of which may further have a substituent group.

a11 to a14 each represent the number of $X^{11}$ to $X^{14}$ substituent groups, respectively, and each represent an integer of 0 to 2 provided that a11 to a14 do not simultaneously represent 0. When a11 to a14 each represent 2, two of $X^{11}$ to $X^{14}$ groups may be the same or different. $M^1$ represents a hydrogen atom, a metal element or an oxide, hydroxide or halide thereof.

In formula (C-II), a11 to a14 each independently represent an integer of 1 or 2 satisfying preferably the relationship $4 \leq a11+a12+a13+a14 \leq 8$, more preferably $4 \leq a11+a12+a13+a14 \leq 6$, and still more preferably a11=a12=a13=a14=1.

The combination of substituent groups in the compound represented by formula (C-II) is particularly preferably as follows: that is, each of $X^{11}$ to $X^{14}$ is particularly preferably —$SO^2$—$Z^{11}$ or —$SO_2NR^{23}R^{24}$. $Z^{11}$ is preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. $R^{23}$ is preferably a hydrogen atom, a substituted or unsubstituted alkyl group, a substituted or unsubstituted aryl group or a substituted or unsubstituted heterocyclic group, and most preferably a hydrogen atom, a substituted alkyl group, a substituted aryl group or a substituted heterocyclic group. $R^{24}$ is preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. Each of $Y^{11}$ to $Y^{18}$ is preferably a hydrogen atom, halogen atom, alkyl group, aryl group, cyano group, alkoxy group, amide group, ureido group, sulfonamide group, carbamoyl group, sulfamoyl group or alkoxycarbonyl group, more preferably a hydrogen atom, halogen atom or cyano group, and most preferably a hydrogen atom. Each of a11 to a14 is preferably 1 or 2, more preferably 1. $M^1$ represents a hydrogen atom, a metal element or an oxide, hydroxide or halide thereof, more preferably Cu, Ni, Zn and Al, most preferably Cu.

The compound represented by formula (C-II) is a compound wherein preferably at least one substituent group, more preferably two or more substituent groups, most preferably all substituent groups are the preferable groups described above.

The compound represented by formula (C-I) is generally a mixture of analogues which, depending on its synthesis method, are inevitably different in the positions of the substituent groups Rn (n=1 to 4) and Yq (q=1 to 4) and the number of the substituent groups, and the mixture of these analogues is expressed often as a statistically average mixture. In the invention, mixtures of these analogues are classified into the following 3 mixtures, and a specific mixture was found to be particularly preferable.

In the invention, mixtures of the phthalocyanine dye analogues, that is, the compounds represented by formula (C-I) or (C-II), are defined by classifying them into the following 3 mixtures depending on the positions of substituent groups.

(1) Derivatives substituted at the β-position: the phthalocyanine dye having specific substituent groups at the 2- and/or 3-positions, 6- and/or 7-positions, 10- and/or 11-positions, and 14- and/or 15-positions.

(2) Derivatives substituted at the α-position: the phthalocyanine dye having specific substituent groups at the 1- and/or 4-positions, 5- and/or 8-positions, 9- and/or 12-positions, and 13- and/or 16-positions.

(3) Derivatives substituted at the α- and β-positions: the phthalocyanine dye having specific substituent groups at random at the 1- to 16-positions.

When the phthalocyanine dye derivatives different in structure (particularly with respect to the positions of substituent groups) are described in the specification, the above-described derivatives substituted at the β-position, derivatives substituted at the α-position and derivatives substituted at the α- and β-positions are used.

The phthalocyanine derivatives used in the invention can be synthesized by a combination of methods described or mentioned in Phthalocyanines—Chemistry and Functions (in Japanese)—(pp. 1-62) coauthored by Shirai & Kobayashi and published by I.P.C and in Phthalocyanines—Properties and Applications—(pp. 1-54) coauthored by C. C. Leznoff & A. B. P. Lever and published by VCH, or by their analogous methods.

As described in WO 00/17275, WO 00/08103, WO 00/08101, WO 98/41853 and JP-A No. 10-36471, the compounds represented by formula (C-I) in the invention can be synthesized, for example, through conversion of unsubstituted phthalocyanine compounds into their corresponding sulfonated derivatives, sulfonyl chloride derivatives and amidated derivatives. In this case, sulfonation can occur in any positions of the phthalocyanine nucleus, and regulation of the number of sulfo groups introduced is difficult. Accordingly, when sulfo groups are introduced under such reaction conditions, the positions and number of sulfo groups introduced into the product cannot be specified, thus inevitably giving a mixture of compounds different in the number and positions of the substituent groups. Accordingly, when such a mixture is used as the starting material to synthesize the compound of the invention, the number and positions of sulfamoyl substituent groups on the heterocyclic ring cannot be specified, and thus the compound of the invention is obtained as a mixture of compounds substituted at the α- and β-positions, containing several kinds of compounds different in the number and positions of the substituent groups.

As described above, when a larger number of electron-withdrawing groups such as sulfamoyl group are introduced into the phthalocyanine nucleus, oxidation potential becomes higher, and ozone resistance is increased. According to the synthesis methods described above, the number of electron-withdrawing groups is low, that is, contamination with phthalocyanine dyes poorer in oxidation potential is inevitable. Accordingly, synthesis methods capable of suppressing formation of compounds poorer in oxidation potential are used more preferably in order to improve ozone resistance.

On the other hand, the compounds represented by formula (C-II) in the invention can be derived from compounds obtained by reacting, for example, a phthalonitrile derivative (compound P) represented by the following formula and/or a diiminoisoindoline derivative (compound Q) represented by the following formula with a metal derivative represented by the following formula (C-III).

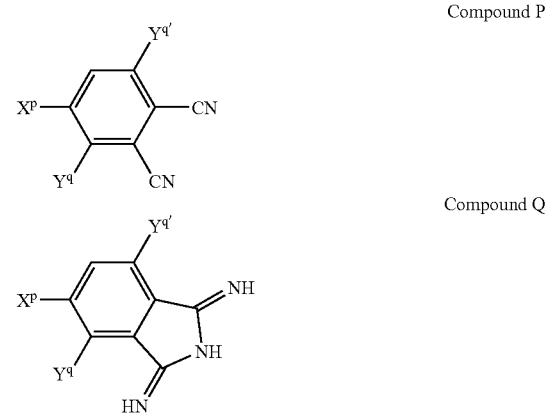

Compound P

Compound Q

In the compounds P and Q, p represents 11 to 14, and q and q' each independently represent 11 to 18.

$$M-(Y)_d \qquad \text{Formula (C-III)}$$

In the above formula (C-III), M has the same meaning as that of M or $M^1$ in formulae (C-I) to (C-II); Y represents a monovalent or divalent ligand such as a halogen atom, acetate anion, acetyl acetonate or oxygen; and d is an integer of 1 to 4.

According to the synthesis method described above, a specific number of desired substituent groups may be introduced. In particular, when a large number of electron-withdrawing groups are to be introduced for increasing oxidation potential, the above synthesis method is very superior to the method of synthesizing the compounds represented by formula (C-I).

The thus obtained compounds represented by formula (C-II) are usually a mixture of compounds represented by formulae (C-II-1) to (C-II-4) shown below, which are isomers with respect to the positions of $X^p$ groups, that is, derivatives substituted at the β-position (phthalocyanine dyes having specific substituent groups at the 2- and/or 3-positions, the 6- and/or 7-positions, the 10- and/or 11-positions, the 14- and/or 15-positions).

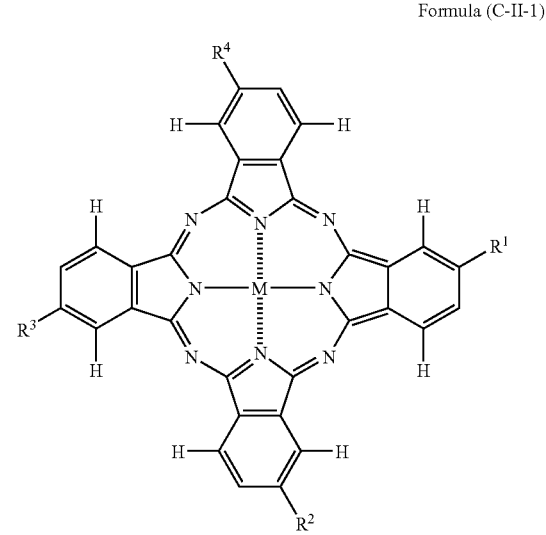

Formula (C-II-1)

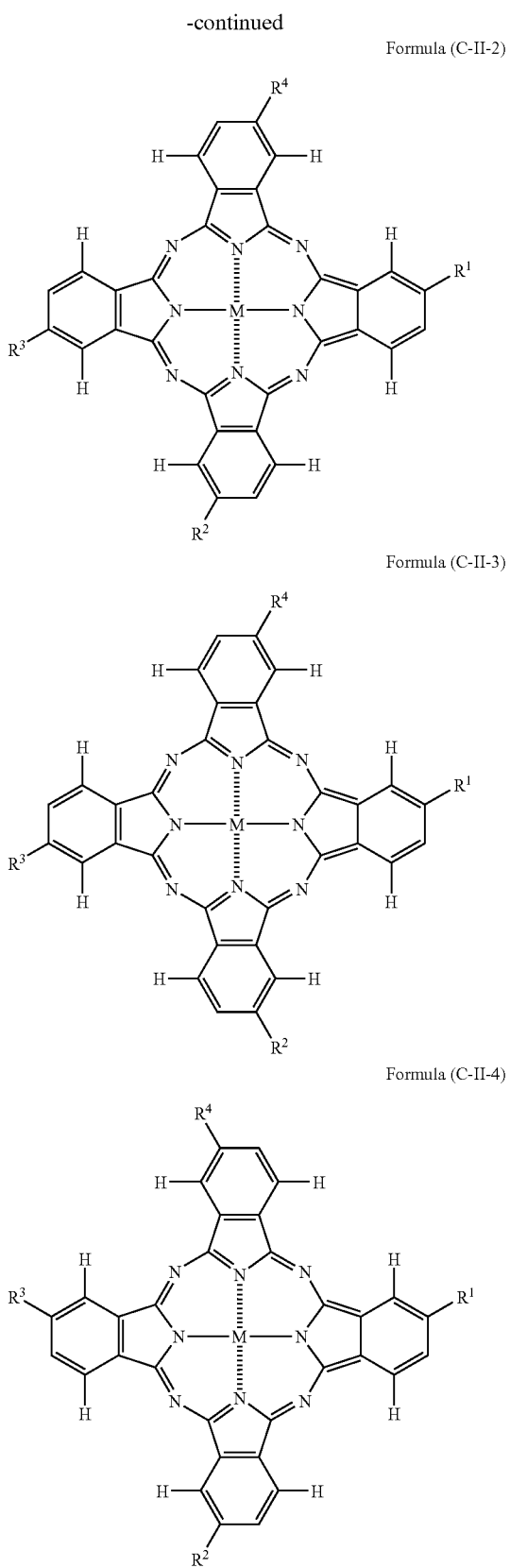

Formula (C-II-2)

Formula (C-II-3)

Formula (C-II-4)

$R^1$ to $R^4$ in formulae (C-II-1) to (C-II-4) have the same meanings as those of $(X^{11})_{a11}$ to $(X^{14})_{a14}$ in formula (C-II).

In the invention, oxidation potential higher than 1.0 V (vs SCE) is found to be very important for improving fastness in any substitution types. In particular, the isomers substituted at the β-position tend to be superior to the isomers substituted at the α- and β-positions in respect of hue, light fastness, and ozone gas resistance.

Preferable examples of the compounds represented by formulae (C-I) or (C-II) include, but are not limited to, Compounds (C-101 to C-120) shown in Japanese Patent Application No. 2002-10361.

The compounds represented by formula (C-I) may be synthesized according to the above-mentioned patent applications. The compounds represented by formula (C-II) may be synthesized by the methods described in JP-A Nos. 2000-292645, 2001-237090, 2001-243524 and 2001-280387. However, the starting materials, dye intermediates and synthesis route are not limited thereto.

The content of the oil-soluble dye in the ink-jet recording ink is preferably 0.05 to 50% by mass, more preferably 0.1 to 10% by mass, based on a total mass of the ink.

-Oil-soluble Polymer-

The colored fine particles constituting the ink-jet recording ink of the invention can be produced from at least one kind of oil-soluble polymer. The structure of the oil-soluble polymer includes a polymer obtained by polycondensation and a polymer obtained from a vinyl monomer. By incorporating the oil-soluble polymer, an image formed on an arbitrarily selected recording material can improve stability, that is, water resistance, light resistance (particularly ozone resistance) and abrasion resistance. Hereinafter, the oil-soluble polymer is described in more detail.

As the oil-soluble polymer, a homopolymer of an arbitrary monomer selected from a monomer group illustrated later or a copolymer of a combination of arbitrary monomers may be used. The usable monomer unit is not particularly limited, and an arbitrary monomer can be used insofar as it may be polymerized by usual radical polymerization.

The polymer obtained by polycondensation is preferably a polyester polymer, and for example, a resin composed of a polyvalent carboxylic acid and a polyvalent alcohol, polymerized from a single monomer or a combination of two or more monomers, may be mentioned.

The polyvalent carboxylic acid includes, but is not limited to, aromatic polyvalent carboxylic acids, aromatic oxycarboxylic acids, aliphatic dicarboxylic acids and alicyclic dicarboxylic acids such as terephthalic acid, isophthalic acid, orthophthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene-2,7-dicarboxylic acid, 5[4-sulfophenoxy]isophthalic acid, sulfoterephthalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid and pyromellitic acid, and these may also be used as metal salts, ammonium salts, etc.

The polyvalent alcohol includes, but is not limited to, aliphatic polyvalent alcohols, alicyclic polyvalent alcohols and aromatic polyvalent alcohols such as ethylene glycol, propylene glycol, 1,3-propane diol, 2,3-butane diol, 1,4-butane diol, 1,5-pentane diol, 1,6-hexane diol, neopentyl glycol, diethylene glycol, dipropylene glycol, 2,2,4-trimethyl-1,3-pentane diol, polyethylene glycol, polypropylene glycol, polytetramethylene glycol, trimethylol ethane, trimethylol propane, glycerine, pentaerythritol, 1,4-cyclohexane diol, 1,4-cyclohexane dimethanol, spiroglycol, tricyclodecane diol, tricyclodecane dimethanol, metaxylene glycol, orthoxylene glycol, 1,4-phenylene glycol, bisphenol A, lactone-based polyester and polyol.

A polyester resin obtained as a homopolymer or a copolymer of the polyvalent carboxylic acid and polyvalent alcohol may be used after a polar group at the terminal of a polymer chain is blocked with a generally known compound capable of blocking.

The polymer obtained from the vinyl monomer may be a homopolymer of an arbitrary monomer, or a copolymer of a combination of arbitrary monomers, selected from a monomer group illustrated below. The usable monomer unit is not particularly limited, and an arbitrary monomer may be used insofar as it can be polymerized by ordinary radical polymerization.

Hereinafter, examples of the monomers are shown below, but the invention is not limited thereto.

The monomer group includes, for example, olefins, $\alpha,\beta$-unsaturated carboxylic acids and salts thereof, $\alpha,\beta$-unsaturated carboxylic acid derivatives, $\alpha,\beta$-unsaturated carboxylic acid amides, styrene and derivatives thereof, vinyl ethers, vinyl esters, and other polymerizable monomers.

The olefins include ethylene, propylene, isoprene, butadiene, vinyl chloride, vinylidene chloride, 6-hydroxy-1-hexene, cyclopentadiene, 4-pentenoic acid, methyl 8-nonenoate, vinylsulfonic acid, trimethyl vinyl silane, trimethoxy vinyl silane, butadiene, pentadiene, isoprene, 1,4-divinyl cyclohexane and 1,2,5-trivinyl cyclohexane.

The $\alpha,\beta$-unsaturated carboxylic acid and salts thereof include acrylic acid, methacrylic acid, itaconic acid, maleic acid, sodium acrylate, ammonium methacrylate and potassium itaconate.

The $\alpha,\beta$-unsaturated carboxylic acid derivatives include alkyl acrylates (for example, methyl acrylate, ethyl acrylate, n-butyl acrylate, cyclohexyl acrylate, 2-ethylhexyl acrylate, n-dodecyl acrylate, etc.), substituted alkyl acrylates (for example, 2-chloroethyl acrylate, benzyl acrylate, 2-cyanoethyl acrylate, allyl acrylate, etc.), alkyl methacrylates (for example, methyl methacrylate, n-butyl methacrylate, 2-ethylhexyl methacrylate, n-dodecyl methacrylate, etc.), substituted alkyl methacrylates (for example, 2-hydroxyethyl methacrylate, glycidyl methacrylate, glycerine monomethacrylate, 2-acetoxyethyl methacrylate, tetrahydrofurfuryl methacrylate, 2-methoxyethyl methacrylate, ω-methoxy polyethylene glycol methacrylate (number of polyoxyethylene molecules added=2 to 100), polyethylene glycol monomethacrylate (number of polyoxyethylene molecules added=2 to 100), polypropylene glycol monomethacrylate (number of polyoxyethylene molecules added=2 to 100), 2-carboxyethyl methacrylate, 3-sulfopropyl methacrylate, 4-oxysulfobutyl methacrylate, 3-trimethoxysilylpropyl methacrylate, allyl methacrylate etc.), unsaturated dicarboxylic acid derivatives (for example, monobutyl maleate, dimethyl maleate, monomethyl itaconate, dibutyl itaconate, etc.) and multifunctional esters (for example, ethylene glycol diacrylate, ethylene glycol dimethacrylate, 1,4-cyclohexane diacrylate, pentaerythritol tetramethacrylate, pentaerythritol triacrylate, trimethylol propane triacrylate, trimethylol ethane triacrylate, dipentaerythritol pentamethacrylate, pentaerythritol hexacrylate, 1,2,4-cyclohexane tetramethacrylate, etc.).

The $\alpha,\beta$-unsaturated carboxylic acid amides include, for example, acrylamide, methacrylamide, N-methylacrylamide, N,N-dimethylacrylamide, N-methyl-N-hydroxyethylacrylamide, N-tert-butylacrylamide, N-tert-octylmethacrylamide, N-cyclohexylacrylamide, N-phenylacrylamide, N-(2-acetoacetoxyethyl)acrylamide, N-acryloyl morpholine, diacetone acrylamide, itaconic diamide, N-methyl maleimide, 2-acrylamide-2-methylpropanesulfonic acid, methylene-bis-acrylamide and dimethacryloyl piperazine.

The styrene and derivatives thereof include styrene, vinyl toluene, p-tert-butylstyrene, vinylbenzoic acid, methyl vinylbenzoate, α-methylstyrene, p-chloromethylstyrene, vinyl naphthalene, p-hydroxymethylstyrene, sodium p-styrenesulfonate, potassium p-styrenesulfinate, 1,4-divinylbenzene and 2-acryloylethyl 4-vinylbenzoate.

The vinyl ethers include methyl vinyl ether, butyl vinyl ether and methoxyethyl vinyl ether.

The vinyl esters include vinyl acetate, vinyl propionate, vinyl benzoate and vinylchloroacetate salicylate.

The other polymerizable monomers include N-vinyl pyrrolidone, 2-vinyl oxazoline, 2-isopropenyl oxazoline and divinyl sulfone.

The oil-soluble polymer of the invention synthesized by copolymerizing a combination of the monomers is preferably a homopolymer or copolymer whose major component is acrylamide, methacrylamide, acrylate, methacrylate, styrene, vinyl ester, vinyl ether, or olefin, etc.

Preferable examples of the oil-soluble polymer for use in the invention include, but are not limited to, the following polymers. The monomer ratio is expressed in percentage by weight in parentheses.

(P-1) Poly(N-tert-butyl acrylamide)
(P-2) Poly(cyclohexyl methacrylate)
(P-3) Poly(n-butyl acrylate)
(P-4) Poly(methyl methacrylate)
(P-5) Poly(ethyl methacrylate)
(P-6) Poly(N-cyclohexylamide)
(P-7) Poly(N-sec-butylacrylamide)
(P-8) Poly(N,N-di-n-propylacrylamide)
(P-9) N-tert-butylacrylamide/2-hydroxyethyl methacrylate copolymer (80/20)
(P-10) Methyl acrylate/2-acrylamide-2-methylpropanesulfonic acid copolymer (98/2)
(P-11) Methyl acrylate/2-acrylamide-2-methylpropanesulfonic acid/2-acetoacetoxyethyl methacrylate copolymer (91/5/4)
(P-12) Butyl acrylate/sodium 2-acrylamide-2-methylpropanesulfonate/2-acetoacetoxyethyl methacrylate copolymer (90/6/4)
(P-13) Butyl acrylate/styrene/methacrylamide/sodium 2-acrylamide-2-methylpropanesulfonate copolymer (55/29/11/5)
(P-14) Butyl acrylate/styrene/sodium 2-acrylamide-2-methylpropanesulfonate (85/10/5)
(P-15) Polystyrene
(P-16) Poly(4-acetoxystyrene)
(P-17) Styrene/methyl methacrylate/sodium acrylate copolymer (45/50/5)
(P-18) 2-(2'-Hydroxy-5'-methacryloxyethylphenyl)-2H-benzotriazole/ethyl acrylate/sodium 2-acrylamide-2-methylpropanesulfonate copolymer (74/23/3)
(P-19) N-tert-Butylacrylamide/3-acrylamide-3-methylbutanoic acid copolymer (99/1)
(P-20) N-tert-Butylacrylamide/methyl acrylate copolymer (50/50)
(P-21) Methyl methacrylate/methyl acrylate copolymer (50/50)
(P-22) N-tert-Butylacrylamide/sodium 2-acrylamide-2-methylpropanesulfonate copolymer (99/1)
(P-23) N-tert-Butylacrylamide/n-butyl acrylate copolymer (50/50)

(P-24) Styrene/butadiene/acrylic acid copolymer (85/12/3)
(P-25) Styrene/butadiene copolymer (90/10)
(P-26) Ethyl acrylate/styrene/butadiene copolymer (40/50/10)
(P-27) Styrene/methyl methacrylate copolymer (80/20)
(P-28) Ethyl acrylate/styrene/sodium 2-acrylamide-2-methylpropanesulfonate copolymer (55/40/5)
(P-29) n-Butyl acrylate/styrene copolymer (40/60)
(P-30) n-Butyl acrylate/t-butyl acrylate/acrylic acid copolymer (47/50/3)
(P-31) 2-Ethylhexyl acrylate/styrene copolymer (50/50)
(P-32) Poly(n-butyl methacrylate)
(P-33) n-Butyl methacrylate/methacrylic acid copolymer (90/10)
(P-34) 2-Ethylhexyl methacrylate/styrene/2-hydroxyethyl methacrylate/acrylic acid copolymer (40/40/18/2)
(P-35) n-Dodecyl methacrylate/methyl methacrylate/styrene/sodium styrenesulfonate (45/25/25/5)
(P-36) Benzyl methacrylate/methyl acrylate copolymer (80/20)
(P-37) Styrene/n-butyl acrylate/allyl methacrylate copolymer (40/30/30)
(P-38) 2-Ethylhexyl methacrylate/styrene/allyl methacrylate/methacrylic acid copolymer (30/35/30/5)
(P-39) Vinyl acetate (homopolymer)
(P-40) t-Butyl acrylamide/n-butyl acrylate/2-carboxyethyl acrylate copolymer (45/45/10)
(P-41) Methyl acrylate/2-acetoacetoxyethyl methacrylate/acrylic acid copolymer (80/17/3)
(P-42) t-Butyl acrylamide/n-butyl acrylate copolymer (50/50)

Among those described above, an oil-soluble polymer having a dissociable group, and an oil-soluble polymer having a carboxyl group and/or a sulfonic acid group as the dissociable group is most preferable. The amount of the dissociable group in the oil-soluble polymer is preferably 0.2 to 4.0 mmol/g, more preferably 0.4 to 2.0 mmol/g. The oil-soluble polymers may be used alone or in combination of two or more thereof.

In order to polymerize the oil-soluble polymer, a polymerization initiator is generally used.

The polymerization initiator includes azobis compounds, peroxides, hydroperoxides and redox catalysts, and preferable examples thereof include inorganic peroxides such as potassium peroxide and ammonium persulfate, organic peroxides such as t-butyl peroctoate, benzoyl peroxide, isopropyl percarbonate, 2,4-dichlorobenzoyl peroxide, methyl ethyl ketone peroxide, cumene hydroperoxide and dicumyl peroxide, and azo compounds such as 2,2'-azobisisobutyrate, sodium 2,2'-azobiscyanovalerate, 2,2'-azobis(2-amidinopropane)hydrochloride, 2,2 '-azobis[2-(5-methyl-2-imidazolin-2-yl)propane]hydrochloride and 2,2'-azobis{2-methyl-N-[1,1 '-bis(hydroxymethyl)-2-hydroxyethyl]propionamide}, among which potassium persulfate and ammonium persulfate are more preferable.

Then, synthesis of the oil-soluble polymer by emulsion polymerization is described. The oil-soluble polymer may be synthesized by emulsion polymerization, and an emulsifying agent used in the emulsion polymerization includes anionic, cationic, amphoteric and nonionic surfactants as well as water-soluble polymers. Specific examples thereof include sodium laurate, sodium dodecylsulfate, sodium 1-octoxycarbonylmethyl-1-octoxycarbonylmethanesulfonate, sodium laurylnaphthalenesulfonate, sodium laurylbenzenesulfonate, sodium laurylphosphate, cetyl trimethyl ammonium chloride, N-2-ethylpyridinium chloride, polyoxyethylene nonyl phenyl ether, polyoxyethylene sorbitan lauryl ester, polyvinyl alcohol, and emulsifying agents and water-soluble polymers described in JP-B No. 53-6190.

When the oil-soluble polymer is synthesized by emulsion polymerization, the polymerization initiator, concentration, polymerization temperature and reaction time may be changed easily in a broad range depending on the purpose. The emulsion polymerization reaction may be carried out by preliminarily introducing the initiator into a reaction vessel containing a monomer, a surfactant and an aqueous medium, or by optionally adding a part or the whole of a monomer solution and/or an initiator solution dropwise.

The oil-soluble polymer may be a polymer latex, and the oil-soluble polymer latex can be easily synthesized by ordinary emulsion polymerization. General emulsion polymerization is described in detail in Synthetic Resin Emulsion (in Japanese) edited by Taira Okuda & Hiroshi Inagaki and published by Kobunshi Kankokai, 1978, Application of Synthetic Latex (in Japanese) edited by Takaaki Sugimura, Yasuo Kataoka, Soich Suzuki, Keishi Kasahara and published by Kobunshi Kankokai, 1993, and Chemistry of Synthetic Latex (in Japanese) edited by Soichi Muroi and published by Kobunshi Kankokai, 1970.

The oil-soluble polymer may also be synthesized by solution polymerization or bulk polymerization in the same manner as in emulsion polymerization.

The oil-soluble polymer, together with the oil-soluble dye, is dissolved to form an organic phase (colored fine particles). The ink-jet recording ink of the invention is prepared by emulsifying and dispersing the resultant organic phase (oil phase) in an aqueous phase (aqueous phase).

The content of the oil-soluble polymer to form the colored fine particles according to the invention is preferably 10 to 500% by mass, and more preferably 20 to 300% by mass, based on the oil-soluble dye.

-Photopolymerizable Monomer-

The colored fine particles to constitute the ink-jet recording ink of the invention can be formed from at least one kind of photopolymerizable monomer. The photopolymerizable monomer is cured through polymerization by the action of light such as UV rays, and upon curing through polymerization by irradiating light, an image formed through printing is fixed on an arbitrarily selected recording material, to improve the stability of the image, that is, water resistance, light resistance (particularly ozone resistance) and abrasion resistance.

Preferable examples of the photopolymerizable monomer include radical-polymerizable monomers and cationic polymerizable monomers. The radical-polymerizable monomers include those based on acrylate, unsaturated polyester, polyester acrylate, urethane acrylate and epoxy acrylate. The cationic polymerizable monomers include those based on epoxy, oxetane and vinyl ether.

To prepare the ink-jet recording ink, the photopolymerizable monomer may be used, for example, in the following manner. That is, the photopolymerizable monomer to be polymerized by the action of UV rays is dissolved preferably together with the oil-soluble dye and a photopolymerization initiator described later, to form an oil phase which is then added to and emulsified in an aqueous phase, followed by adding additives such as a high-boiling organic solvent and a viscosity modifier to thereby prepare an ink-jet recording ink. When forming an image with this ink-jet recording ink, the ink-jet recording ink is discharged to print an image, and the surface of the image is irradiated with light such as UV rays, and in this step, the formed image is fixed on a recording medium.

Specific examples of the radical-polymerizable monomer are shown below. However, the invention is not limited thereto.

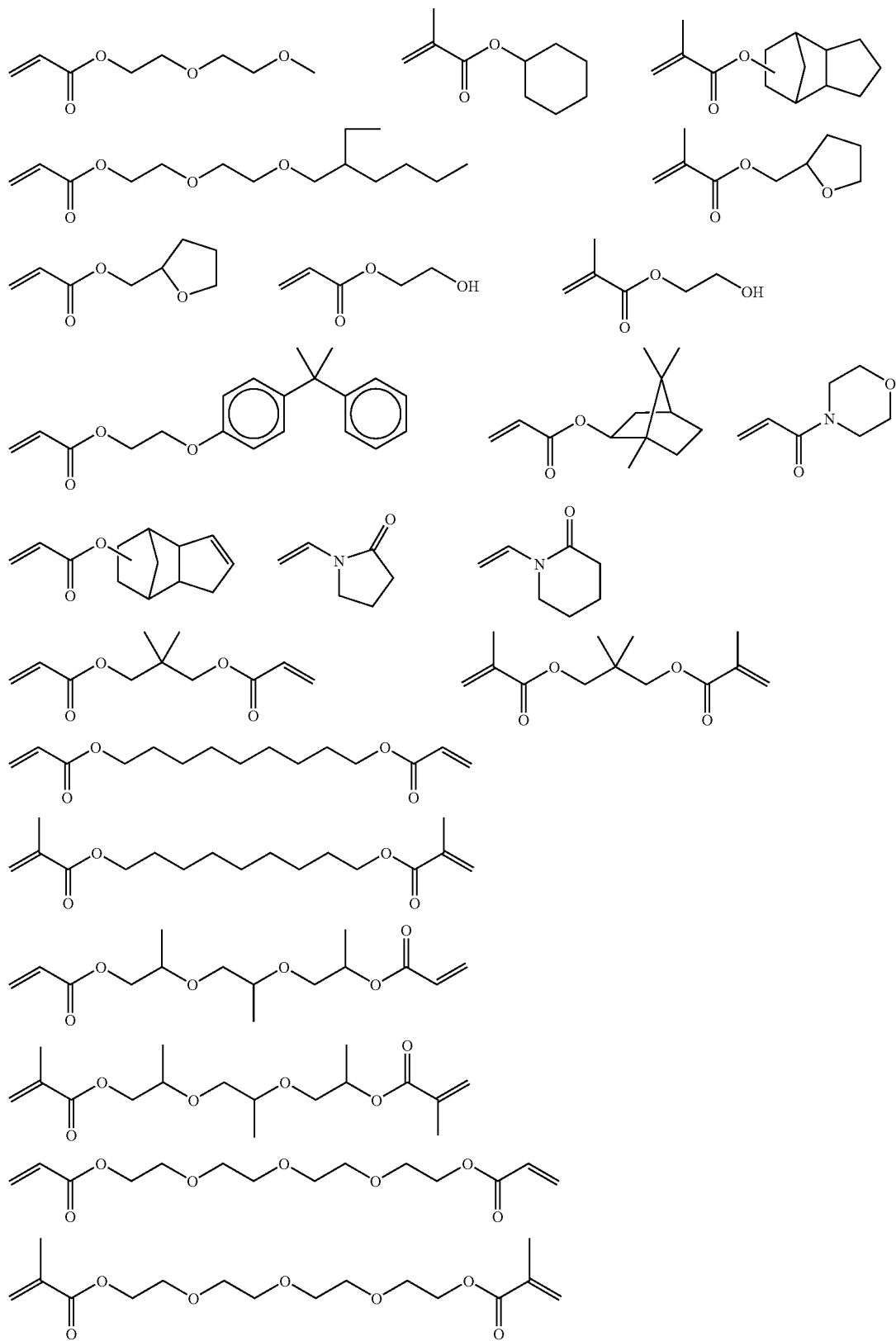

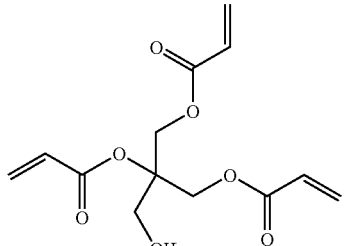
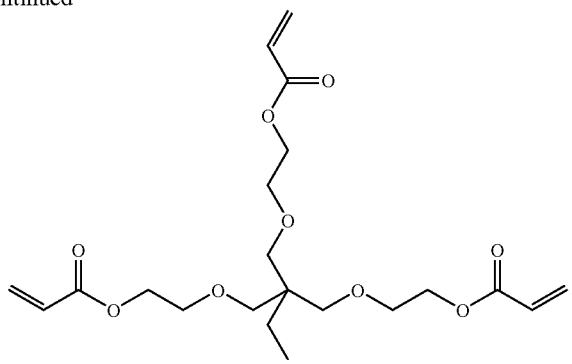
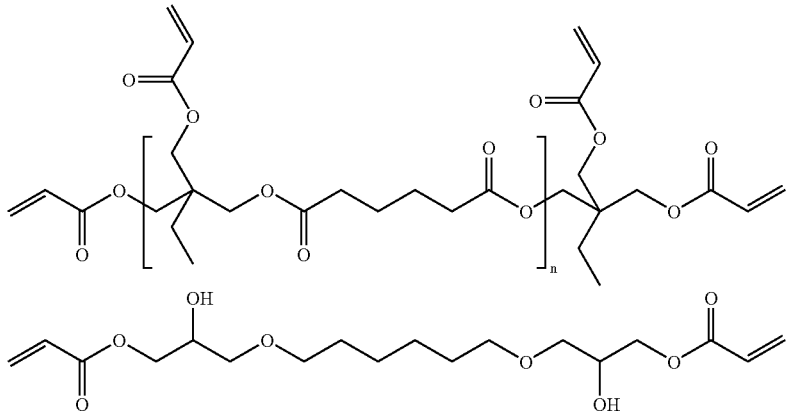
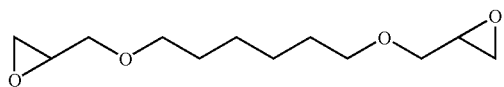

Specific examples of the cationic polymerizable monomers are shown below. However, the invention is not limited thereto.

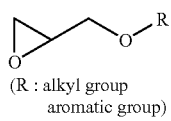
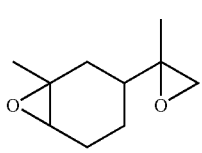
(R : alkyl group aromatic group)

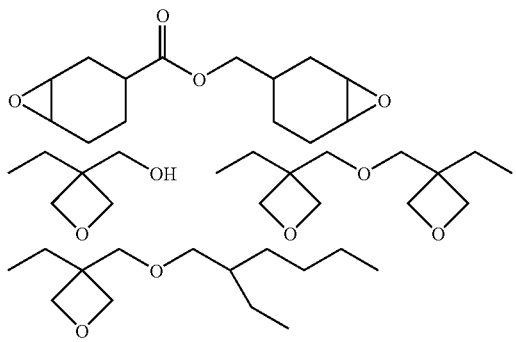

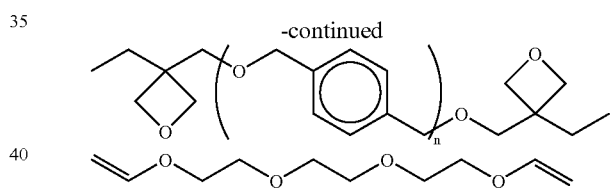

The content of the photopolymerizable monomer is preferably 50 to 500% by mass, and more preferably 100 to 300% by mass, based on the oil-soluble dye. When the content is less than 50% by mass, the image may be blurred during storage, while when the content is higher than 500% by mass, print density may be lowered, and discharge ability of the ink may be impaired.

-Photopolymerization Initiator-

The photopolymerization initiator is a compound to accelerate the polymerization reaction of the photopolymerizable monomer that forms the colored fine particles. The photopolymerization initiator is preferably a radical generating agent or a cationic photo-initiator. The photopolymerization initiator is contained in the ink, preferably together with the photopolymerizable monomer, and generates a radical or cation upon exposure to light such as UV rays, to thus effectively initiate and accelerate the polymerization reaction of the photopolymerizable monomer.

The radical generating agent includes those based on acetophenone, benzoin ether, phosphine oxide, benzophenone and thioxanthone, and the accelerator for generating radicals includes amines.

Specific examples thereof include Irgacure 184, Darucure 1173, DEAP, Irgacure 651, Irgacure 907, Irgacure 369, Irgacure 2959, Irgacure 819, Lucirin TPO, CGI 403, benzophenone and the following compounds.

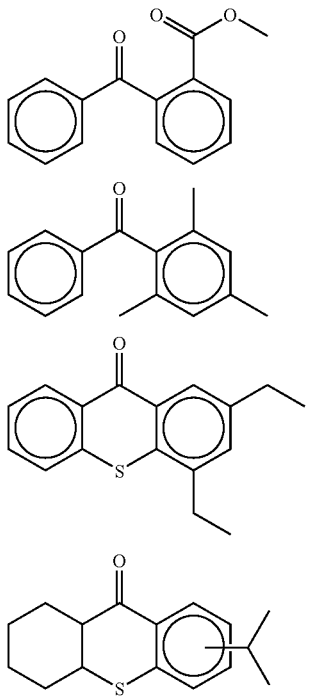

As the accelerator, the amines include triethanolamine and the following compounds.

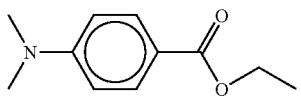

The cationic photo-initiator includes, for example, the following compounds:

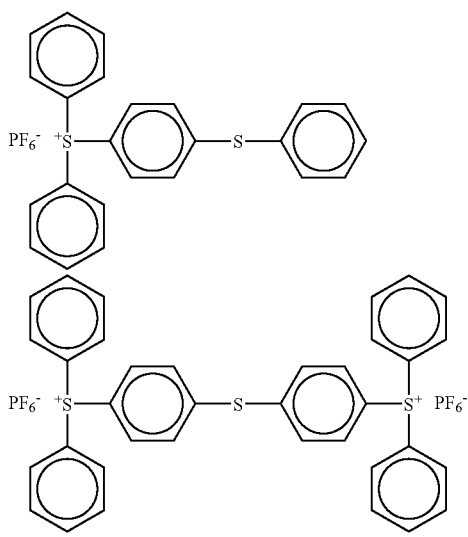

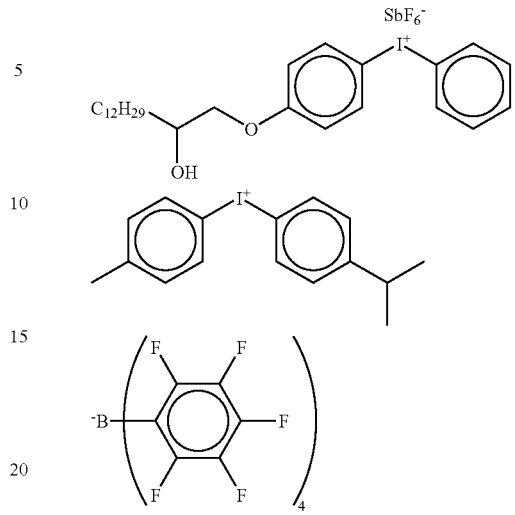

The addition amount of the photopolymerization initiator is preferably 0.05 to 10% by mole, and more preferably 0.1 to 5% by mole, based on the photopolymerizable monomer. When the amount is less than 0.05% by mole, the polymerization reaction may not proceed rapidly, thus causing blurring, while when the amount is higher than 10% by mole, clogging may take place at a head.

-High-boiling Organic Solvent-

In preparing the colored fine particles forming the ink-jet recording ink of the invention, a high-boiling organic solvent capable of dissolving the oil-soluble dye and the oil-soluble polymer or the photopolymerizable monomer is generally used. The high-boiling organic solvent is effective in preparing stable colored fine particles that produce an excellent hue.

The colored fine particles according to the invention may be prepared, for example, by emulsifying and dispersing a solution containing at least one kind of oil-soluble dye, at least one kind of oil-soluble polymer or photopolymerizable monomer, at least one kind of high-boiling organic solvent, and if necessary a co-solvent that has a boiling point of 200° C. or less and a water-solubility of 25 g or less, in an aqueous medium (and then removing the co-solvent, if any).

The high-boiling organic solvent is an organic solvent that has a boiling point of 200° C. or more and a melting point of 80° C. or less, particularly preferably a solvent that has a water-solubility of 4 g or less at 25° C.. When the water-solubility (at 25° C.) is higher than 4 g, the colored fine particles to form the ink composition may be easily become coarse and aggregated with time, thus significantly adversely affecting discharge ability of the ink. The water-solubility is preferably 4 g or less, more preferably 3 g or less, still more preferably 2 g or less, and further still more preferably 1 g or less.

The "water-solubility" as used herein refers to a saturated concentration of water in the high-boiling organic solvent at 25° C., that is, the amount (g) of water that is soluble in 100 g of the high-boiling organic solvent at 25° C.

The content of the high-boiling organic solvent is preferably 5 to 200% by mass, and more preferably 10 to 100% by mass, relative to the oil-soluble dye in the colored fine particles.

The high-boiling organic solvent is preferably a compound represented by formulae (Q-1) to (Q-9):

$$O=P \begin{matrix} (O)_a-R_1 \\ (O)_b-R_2 \\ (O)_c-R_3 \end{matrix} \quad (Q\text{-}1)$$

(Q-2) benzene ring with $(R_6)_d$ substituent and $COOR_4$, $COOR_5$ groups $(Ar-COO)_e-R_7$ (Q-3)

$(R_8-COO)_f-R_9$ (Q-4)

$R_{10}-(COO-R_{11})_g$ (Q-5)

$R_{12}-X-N \begin{matrix} R_{13} \\ R_{14} \end{matrix}$ (Q-6)

(Q-7) HO—phenyl—$R_{15}$ with $(R_{16})_h$ (Q-8) $R_{17}R_{18}N$—phenyl with $(R_{19})_f$ $R_{20}-\underset{\underset{(O)_j}{\parallel}}{S}-R_{21}$ (Q-9)

In formula (Q-1), $R^1$, $R^2$ and $R^3$ each independently represent an aliphatic or aryl group. a, b and c each independently represent 0 or 1.

In formula (Q-2), $R^4$ and $R^5$ each independently represent an aliphatic or aryl group, $R^6$ represents a halogen atom (F, Cl, Br, I; hereinafter, a halogen atom refers to these elements), an alkyl group, alkoxy group, aryloxy group, alkoxycarbonyl group or aryloxycarbonyl group, d is an integer of 0 to 3, and when d is a plural number, plural $R^6$ groups may be the same or different.

In formula (Q-3), Ar represents an aryl group, e is an integer of 1 to 6, and $R^7$ represents an e-valent hydrocarbon group or a hydrocarbon group containing an ether linkage.

In formula (Q-4), $R^8$ represents an aliphatic group, f is an integer of 1 to 6, and $R^9$ represents an f-valent hydrocarbon group or a hydrocarbon group containing an ether linkage.

In formula (Q-5), g is an integer of 2 to 6, $R^{10}$ represents a g-valent hydrocarbon group (excluding an aryl group), and $R^{11}$ represents an aliphatic group or aryl group.

In formula (Q-6), $R^{12}$, $R^{13}$ and $R^{14}$ each independently represent a hydrogen atom, aliphatic group or aryl group. X represents —CO— or —$SO_2$—. $R^{12}$ and $R^{13}$, or $R^{13}$ and $R^{14}$, may be mutually bound to each other to form a ring.

In formula (Q-7), $R^{15}$ represents an aliphatic group, alkoxycarbonyl group, aryloxycarbonyl group, alkylsulfonyl group, arylsulfonyl group, aryl group or cyano group, $R^{16}$ represents a halogen atom, aliphatic group, aryl group, alkoxy group or aryloxy group, h is an integer of 0 to 3, and when h is a plural number, plural $R^{16}$ groups may be the same or different.

In formula (Q-8), $R^{17}$ and $R^{18}$ each independently represent an aliphatic group or aryl group; $R^{19}$ represents a halogen atom, aliphatic group, aryl group, alkoxy group or aryloxy group; i is an integer of 0 to 4, and when i is a plural number, plural $R^{19}$ groups may be the same or different.

In formula (Q-9), $R^{20}$ and $R^{21}$ each independently represent an aliphatic group or aryl group; and j is 1 or 2.

When $R^1$ to $R^6$, $R^8$, and $R^{11}$ to $R^{21}$ in formulae (Q-1) to (Q-9) represent an aliphatic group or a group containing an aliphatic group, the aliphatic group may be a liner, branched or cyclic group or may contain an unsaturated bond or a substituent group. Examples of the substituent group include a halogen atom, aryl group, alkoxy group, aryloxy group, alkoxycarbonyl group, hydroxyl group, acyloxy group and epoxy group.

When $R^1$ to $R^6$, $R^8$, and $R^{11}$ to $R^{21}$ in formulae (Q-1) to (Q-9) represent a cyclic aliphatic group, that is, a cycloalkyl group, or a group containing a cycloalkyl group, the cycloalkyl group is a 3- to 8-memberred ring which may contain an unsaturated bond or may have a substituent group or a crosslinked group. Examples of the substituent group include a halogen atom, aliphatic group, hydroxyl group, acyl group, aryl group, alkoxy group, epoxy group and alkyl group, and examples of the crosslinking group include methylene, ethylene and isopropyridene.

When $R^1$ to $R^6$, $R^8$, and $R^{11}$ to $R^{21}$ in formulae (Q-1) to (Q-9) represent an aryl group or a group containing an aryl group, the aryl group may be substituted with a substituent group such as a halogen atom, aliphatic group, aryl group, alkoxy group, aryloxy group and alkoxycarbonyl group.

When $R^7$, $R^9$ or $R^{10}$ in formulae (Q-3), (Q-4) and (Q-5) is a hydrocarbon group, the hydrocarbon group may contain a cyclic structure (for example, a benzene ring, cyclopentane ring, cyclohexane ring) or an unsaturated bond, or may have a substituent group. Examples of the substituent group include a halogen atom, hydroxyl group, acyloxy group, aryl group, alkoxy group, aryloxy group and epoxy group.

Among the high-boiling organic solvents represented by formulae (Q-1) to (Q-9), particularly preferable high-boiling organic solvents are described below.

In formula (Q-1), $R^1$, $R^2$ and $R^3$ each independently represent C1 to C24 (preferably C4 to C18) aliphatic group (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butycyclohexyl, 4-methylcyclohexyl) or C6 to C24 (preferably C6 to C18) aryl group (for example, phenyl, cresyl, p-nonylphenyl, xylyl, cumenyl, p-methoxyphenyl, p-methoxycarbonylphenyl). a, b and c each independently represent 0 or 1, and more preferably, all of a, b and c represent 1.

In formula (Q-2), $R^4$ and $R^5$ each independently represent C1 to C24 (preferably, C4 to C18) aliphatic group (for example, the same alkyl group as mentioned in $R^1$ above, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, 1-methylcyclohexyl) or a C6 to C24 (preferably, C6 to C18) aryl group (for example, the same aryl group as mentioned in $R^1$ above, 4-t-butylphenyl, 4-t-octylphenyl, 1,3,5-trimethylphenyl, 2,4-di-t-butylphenyl, 2,4-di-t-pentylphenyl), $R^6$ represents a halogen atom (preferably, a chlorine atom), a C1 to C18 alkyl group (for example, methyl, isopropyl, t-butyl, n-dodecyl), a C1 to C18 alkoxy group (for example, methoxy, n-butoxy, n-octyloxy, methoxyethoxy, benzyloxy), a C6 to C18 aryloxy group (for example, phenoxy, p-tolyloxy, 4-methoxyphenoxy, 4-t-butylphenoxy) or a C2 to C19 alkoxycarbonyl group (for example, methoxycarbonyl, n-butoxycarbonyl, 2-ethylhexyloxycarbonyl) or a C6 to C25 aryloxycarbonyl group, and d is 0 or 1.

In formula (Q-3), Ar represents a C6 to C24 (preferably, C6 to C18) aryl group (for example, phenyl, 4-chlorophenyl, 4-methoxyphenyl, 1-naphthyl, 4-n-butoxyphenyl, 1,3,5-trimethylphenyl), e is an integer of 1 to 4 (preferably 1 to 3), $R^7$ represents an e-valent C2 to C24 (preferably, C2 to C18) hydrocarbon group (for example, the same alkyl group, cycloalkyl group and aryl group as mentioned for $R^4$ above, —$(CH_2)_2$—, or the following groups),

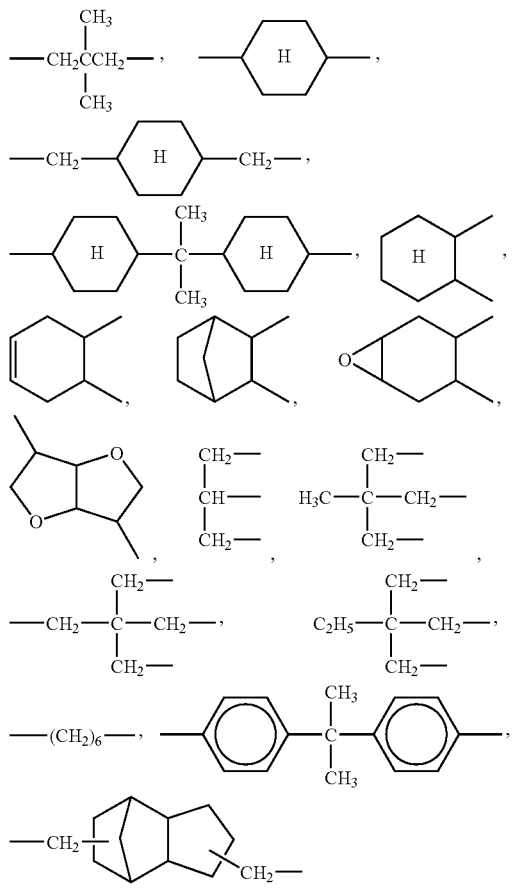

or an ether-linkage-containing e-valent C4 to C24 (preferably, C4 to C18) hydrocarbon group (for example, —$CH_2CH_2OCH_2CH_2$—, —$CH_2CH_2(OCH_2CH_2)_3$—, —$CH_2CH_2CH_2OCH_2CH_2CH_2$—, or the following groups).

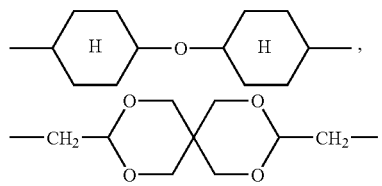

In formula (Q-4), $R^8$ represents a C1 to C24 (preferably, C1 to C17) aliphatic group (for example, methyl, n-propyl, 1-hydroxyethyl, 1-ethylpentyl, n-undecyl, pentadecyl, 8,9-epoxyheptadecyl, cyclopropyl, cyclohexyl, 4-methylcyclohexyl), f is an integer of 1 to 4 (preferably 1 to 3), and $R^9$ represents an f-valent C2 to C24 (preferably, C2 to C18) hydrocarbon group or an ether linkage-containing c-valent C4 to C24 (preferably, C4 to C18) hydrocarbon group (for example, the same group as mentioned for $R^7$ above).

In formula (Q-5), g is an integer of 2 to 4 (preferably 2 or 3), $R^{10}$ represents a g-valent hydrocarbon group (for example, —$CH_2$—, —$(CH_2)_2$—, —$(CH_2)_4$—, —$(CH_2)_7$—, or the following groups),

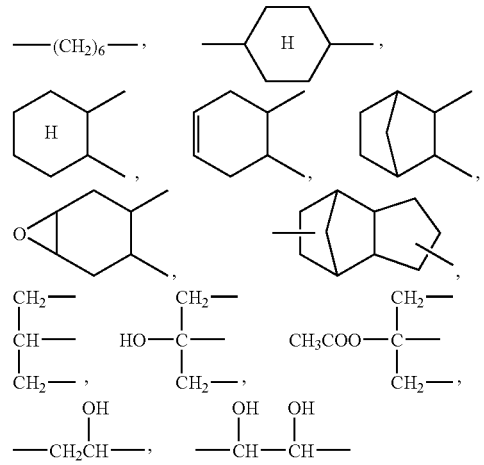

and $R^{11}$ represents a C1 to C24 (preferably, C4 to C18) aliphatic group or a C6 to C24 (preferably, C6 to C18) aryl group (for example, the same aliphatic and aryl group as mentioned in $R^4$ above).

In formula (Q-6), $R^{12}$ represents a hydrogen atom, a C1 to C24 aliphatic group (preferably C3 to C20) [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, 4-methylcyclohexyl] or a C6 to C24 (preferably, C6 to C18) aryl group (for example, the same aryl group as mentioned in Ar above), and $R^{13}$ and $R^{14}$ each independently represent a hydrogen atom, a C1 to C24 (preferably, C1 to C18) aliphatic group (for example, methyl, ethyl, isopropyl, n-butyl, n-hexyl, 2-ethylhexyl, n-dodecyl, cyclopentyl, cyclopropyl) or a C6 to C18 (preferably, C6 to C15) aryl group (for example, phenyl, 1-naphthyl, p-tolyl). $R^{13}$ and $R^{14}$, together with N, may be combined to form a pyrrolidine ring, piperidine ring or morpholine ring, and $R^{12}$ and $R^{13}$ may be combined to form a pyrrolidone ring. X is —CO— or —$SO_2$—, preferably —CO—.

In formula (Q-7), $R^{15}$ represents a C1 to C24 (preferably, C3 to C18) aliphatic group (for example, methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, cyclohexyl), a C2 to C24 (preferably, C5 to C17) alkoxycarbonyl group (for example, n-butoxycarbonyl, 2-ethylhexyloxycarbonyl, n-dodecyloxycarbonyl), a C1 to C24 (preferably, C1 to C18) alkylsulfonyl group (for example, methylsulfonyl, n-butylsulfonyl, n-dodecylsulfonyl), a C6 to C30 (preferably, C6 to C24) arylsulfonyl group (for example, p-tolylsulfonyl, p-dodecylphenylsulfonyl, p-hexadecyloxyphenylsulfonyl), a C6 to C32 (preferably, C6 to C24) aryl group (for example, phenyl, p-tolyl) or a cyano group, $R^{16}$ represents a halogen atom (preferably Cl), a C1 to C24 (preferably, C1 to C18) alkyl group (for example, the same group as mentioned in $R^{15}$ above), a C3 to C18 (preferably, C5 to C17) cycloalkyl group (for example, cyclopentyl, cyclohexyl), a C6 to C32 (preferably, C6 to C24) aryl group (for example, phenyl, p-tolyl), a C1 to C24 (preferably, C1 to C18) alkoxy group (for example, methoxy, n-butoxy, 2-ethylhexyloxy, benzyloxy, n-dodecyloxy, n-hexadecyloxy) or a C6 to C32 (preferably, C6 to C24) aryloxy group (for example, phenoxy, p-t-butylphenoxy, p-t-octylphenoxy, m-pentadecylphenoxy, p-dodecyloxyphenoxy), and h is an integer of 1 to 2.

In formula (Q-8), $R^{17}$ and $R^{18}$ have the same meanings as defined in $R^{13}$ and $R^{14}$ above, and $R^{19}$ has the same meaning as defined for $R^{16}$ above.

In formula (Q-9), $R^{20}$ and $R^{21}$ have the same meanings as defined for $R^1$, $R^2$ and $R^3$ above. j is an integer of 1 or 2, preferably 1.

Examples of the high-boiling organic solvent include Compounds (S-1 to S-93) described in Japanese Patent Application No. 2002-10361, but the invention is not limited thereto.

The high-boiling organic solvents may be used alone or as a mixture of two or more thereof (for example, tricresyl phosphate and dibutyl phthalate, trioctyl phosphate and di(2-ethylhexyl) sebacate, and dibutyl phthalate and poly(N-t-butylacrylamide)).

The weight ratio of the oil-soluble dye:high-boiling organic solvent in the invention is preferably 1:0.01 to 1:1, and more preferably 1:0.05 to 1:0.5.

Examples of compounds used in the invention, other than the high-boiling organic solvents, and/or methods of synthesizing these high-boiling organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, 5,013,639, EP Nos. 276, 319A, 286,253A, 289,820A, 309,158A, 309,159A, 309,160A, 509,311A, 510,576A, East German Patent Nos. 147,009, 157,147, 159,573, and 225,240A, GB-C 2,091,124A, JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338.

-Co-solvent (Assistant Solvent)-

Together with the high-boiling organic solvent, a co-solvent can be used, as necessary. This co-solvent is a low-boiling solvent or a water-soluble organic solvent which is to be removed by evaporation, membrane dialysis or ultrafiltration after emulsification and dispersion of a colorant-containing organic solvent phase.

For preparation of the colored fine particles of the invention, solubility of the co-solvent in water is preferably lower to prepare a stable dispersion having a narrow particle size distribution. On one hand, a certain solubility in water is necessary to facilitate removal of the co-solvent after emulsification and dispersion. Accordingly, a solvent dissolved completely in water, for example, methanol, ethanol, isopropyl alcohol or acetone is not preferable for preparing a stable dispersion having a narrow particle size distribution.

The water-solubility of the co-solvent (in 100 g of water at 25° C.) is preferably 0.5 to 25 g, and more preferably 1 to 20 g. Hereinafter, preferable examples (AS-1 to AS-11) of the co-solvent and the solubility in water (g at 25° C.) are shown below. However, the invention is not limited thereto.

| | Co-solvent | Water-solubility (25° C.) |
|---|---|---|
| (AS-1) | Ethyl acetate | 8 g |
| (AS-2) | Propyl acetate | 2 g |
| (AS-3) | 2-Ethylbutyl acetate | <1 g |
| (AS-4) | 2-Ethylene acetate | 20 g |
| (AS-5) | 2-Ethoxyethyl acetate | 25 g |
| (AS-6) | Butyl acetate | 2 g |
| (AS-7) | Ethyl propionate | 2 g |
| (AS-8) | Acetyl acetone | 12 g |
| (AS-9) | Ethyl acetoacetate | 12 g |
| (AS-10) | 2-(2-n-Butoxyethoxy)ethyl acetate | 2 g |
| (AS-11) | Cyclohexanone | 15 g |

The amount of the co-solvent used is preferably 1 to 200 weight parts, more preferably 2 to 100 weight parts, based on 1 part of the oil-soluble dye in the colored fine particles.

(Compound Represented by Formula (I))

The ink-jet recording ink of the invention comprises the compound represented by formula (I) shown below. This compound is a water-soluble polymer having a hydrophobic group at the terminal thereof, and can effectively prevent aggregation of the organic phase (oil phase) emulsified and dispersed in an aqueous medium (aqueous phase), that is, the colored fine particles (dispersed droplets) comprising at least the oil-soluble dye and the oil-soluble polymer or the photo-polymerizable monomer dissolved therein (generally using a high-boiling organic solvent), to maintain the ink in a uniformly dispersed state.

Accordingly, it is presumed that the oil droplets (dispersed droplets, that is, the colored fine particles) dispersed in an aqueous medium as a dispersing medium are present in the dispersing medium in such a state that the droplets are covered with the polymers having their hydrophobic groups adsorbed onto the surfaces of the oil droplets while the remaining parts of the water-soluble polymers are oriented toward the outside of the droplets, thus permitting the oil droplets to be dispersed uniformly and stably without causing aggregation in the aqueous medium.

As a result, dispersing stability of the oil droplet (colored fine particle) in the ink is improved thereby preventing dispersion from becoming instable and being aggregated during storage for a long period, thus keeping the diameter of a droplet small and preventing liquid clogging at the top of a nozzle in a printer to thereby effectively avoid the discharge failure and image forming incapability.

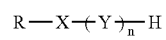

Formula (I)

In formula (I) shown above, R represents a hydrophobic group or a group derived from a hydrophobic polymer.

The hydrophobic group is preferably an aliphatic group (for example, an alkyl group, alkenyl group, alkynyl group etc.), an aromatic group (for example, a phenyl group, naphthyl group etc.) and an alicyclic group, and these groups may be unsubstituted or may further have a substituent group. The substituent group includes an aliphatic group, aromatic group, alicyclic group, heterocyclic group, halogen atom, hydroxyl group, cyano group, nitro group, N-substituted sulfamoyl group, carbamoyl group, acylamino group, alkylsulfonylamino group, arylsulfonylamino group, alkoxy group, aryloxy group, aralkyl group and acyl group.

When the hydrophobic group is a substituted or unsubstituted aliphatic group, aromatic group or alicyclic group, the group is effectively adsorbed onto the surface of a pigment thereby further improving affinity for the pigment, thus exhibiting a particularly outstanding improving effect on stability of the pigment dispersion. Among these, a substituted or unsubstituted aliphatic group is preferable, and the aliphatic group is preferably a C3 to C70 alkyl group, more preferably a C4 to C50 alkyl group, and most preferably a C8 to C24 alkyl group.

The hydrophobic polymer includes polystyrene and derivatives thereof, polymethacrylate (for example, polymethyl methacrylate) and derivatives thereof, polyacrylate and derivatives thereof, and polybutene, water-insoluble vinyl polymers and vinyl copolymers such as polyvinyl chloride, polyvinyl acetate, and polyvinyl bersatate, water-insoluble polyoxyalkylene such as polyoxypropylene and polyoxytetramethylene, and water-insoluble polymers such as polyamide and polyester. Preferable among those described above are polystyrene and derivatives thereof, polymethacrylate and derivatives thereof, polyacrylate and derivatives thereof, and polyvinyl chloride.

The degree of polymerization of the hydrophobic polymer is preferably 2 to 500, more preferably 2 to 200, and still more preferably 2 to 100.

Preferable examples (S-1 to S-51) of the polymer in which R is a hydrophobic group are shown below. However, the invention is not limited thereto.

n-C$_{12}$H$_{25}$— (S-1)

C$_{16}$H$_{33}$— (S-2)

C$_{12}$H$_{25}$NHCOCH$_2$— (S-3)

C$_{12}$H$_{25}$OCH$_2$CH$_2$— (S-4)

(C$_{18}$H$_{37}$)$_2$NCH$_2$CH$_2$CH$_2$— (S-5)

C$_2$H$_5$SO$_2$CH$_2$CH$_2$— (S-6)

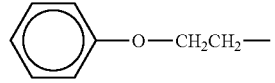 (S-7)

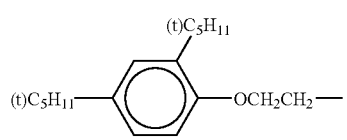 (S-8)

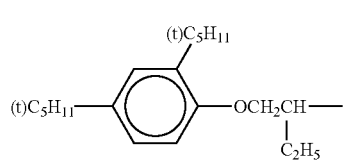 (S-9)

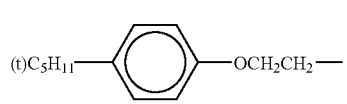 (S-10)

-continued

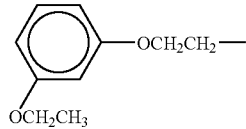 (S-11)

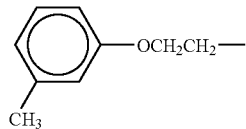 (S-12)

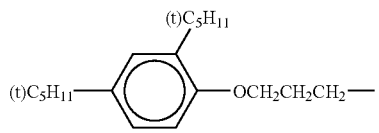 (S-13)

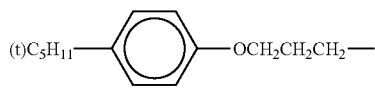 (S-14)

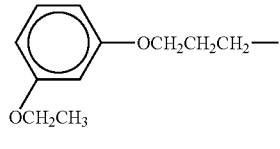 (S-15)

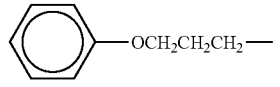 (S-16)

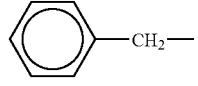 (S-17)

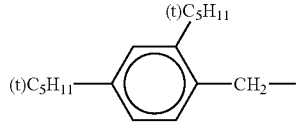 (S-18)

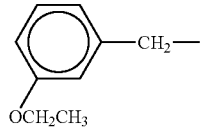 (S-19)

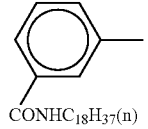 (S-20)

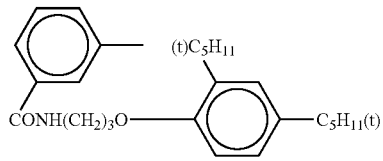 (S-21)

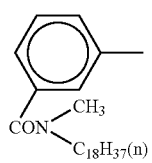 (S-22)

-continued
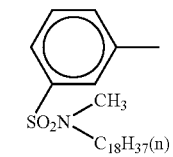
(S-23)
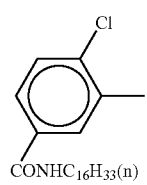
(S-24)
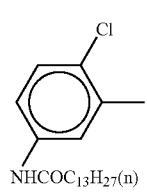
(S-25)
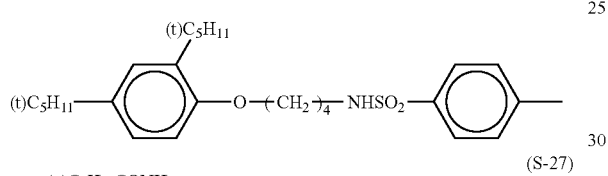
(S-26)
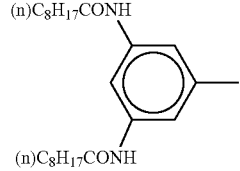
(S-27)
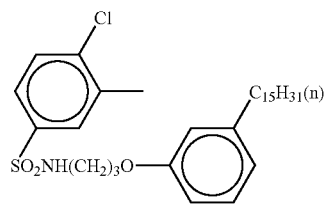
(S-28)
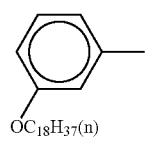
(S-29)
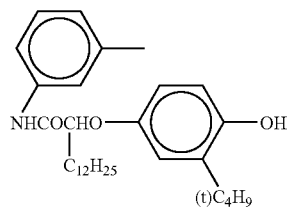
(S-30)
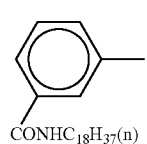
(S-31)
-continued
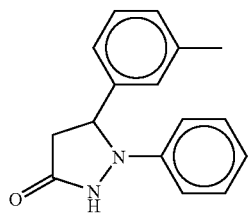
(S-32)
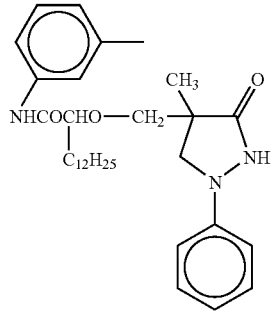
(S-33)
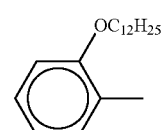
(S-34)
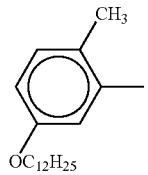
(S-35)
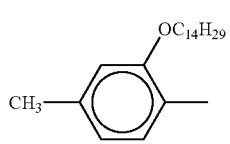
(S-36)
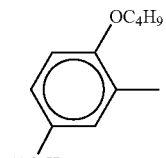
(S-37)
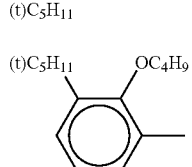
(S-38)
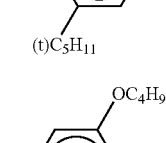
(S-39)

-continued

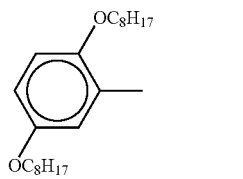
(S-40)

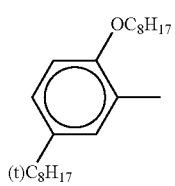
(S-41)

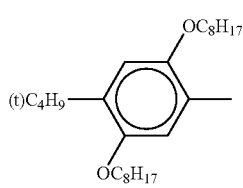
(S-42)

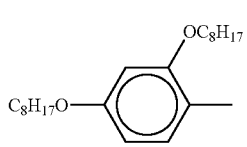
(S-43)

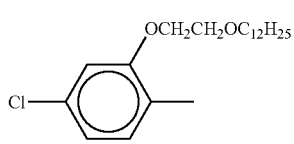
(S-44)

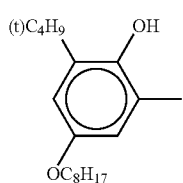
(S-45)

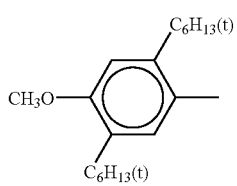
(S-46)

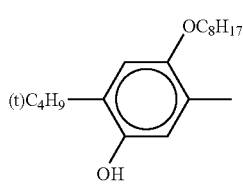
(S-47)

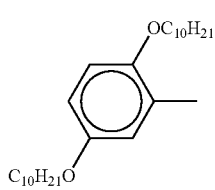
(S-48)

-continued

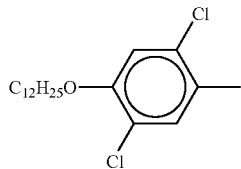
(S-49)

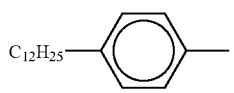
(S-50)

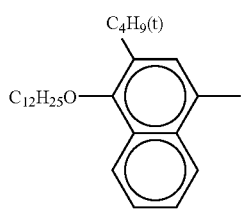
(S-51)

In formula (I), X represents a divalent linking group having a hetero-bond.

The "divalent linking group containing a hetero-bond" includes an ether bond, ester bond, thioether bond, thioester bond, sulfonyl bond, amide bond, imide bond, sulfonamide bond, urethane bond, urea bond, thiourea bond, etc. From the viewpoint of advantageous synthesis or modification, the linking group is preferably an ether bond, ester bond, thioether bond or thioester bond, more preferably an ether bond, ester bond or thioether bond.

In formula (I), Y represents a group including at least one represented by the following structural units A, C and D, and the following structural unit B at 0 to 40% by mole.

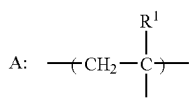

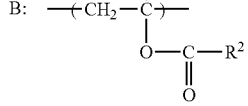

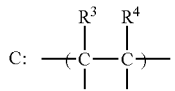

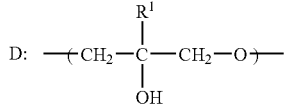

$R^1$ in the structural units A, B and D represented by Y represents a hydrogen atom or a C1 to C6 alkyl group. The C1 to C6 alkyl group is particularly preferably a methyl group.

$R^2$ in the structural unit B represented by Y represents a hydrogen atom or a C1 to C10 alkyl group, and the alkyl group may be substituted with a hydroxyl group, amide group, carboxyl group, sulfonic acid group, sulfinic acid group, sulfonamide group, etc. The C1 to C10 alkyl group is particularly preferably a methyl group.

$R^3$ in the structural unit C represented by Y represents a hydrogen atom or a methyl group, preferably a hydrogen atom. $R^4$ in the structural unit C represented by Y represents a hydrogen atom, —$CH_3$, —$CH_2COOH$ (including an ammonium salt or an alkali metal salt thereof) or —CN, preferably a hydrogen atom or —$CH_2COOH$ (including an ammonium salt or an alkali metal salt thereof).

$Z^1$ in the structural unit C represented by Y represents a hydrogen atom, —COOH (including an ammonium salt or an alkali metal salt thereof) or —$CONH_2$, preferably —COOH (including an ammonium salt or an alkali metal salt thereof). $Z^2$ represents —COOH (including an ammonium salt or an alkali metal salt thereof), —$SO_3H$ (including an ammonium salt or an alkali metal salt thereof), —$OSO_3H$ (including an ammonium salt or an alkali metal salt thereof), —$CH_2SO_3H$ (including an ammonium salt or an alkali metal salt thereof), —$CONHC(CH_3)_2CH_2SO_3H$ (including an ammonium salt or an alkali metal salt thereof) or —$CONHCH_2CH_2CH_2N^+$ $(CH_3)_3Cl^-$, preferably —COOH (including an ammonium salt or an alkali metal salt thereof).

The structural unit A constituting Y includes, for example, structural units derived from vinyl alcohol, α-methyl vinyl alcohol, α-propyl vinyl alcohol, etc.

The structural unit B constituting Y includes, for example, structural units derived from vinyl acetate, vinyl formate, vinyl propionate or α-derivatives thereof.

The structural unit C constituting Y includes structural units derived from monomers dissociable into ions in water, for example, acrylic acid, methacrylic acid or crotonic acid (including an ammonium salt or metal salts such as Na or K salts), maleic acid or itaconic acid (including monoalkyl esters, ammonium salts or metal salts such as Na or K salts), vinylphosphonic acid, vinylsulfuric acid, acrylsulfonic acid, methacrylsulfonic acid, 2-acrylamide-3-methylpropanesulfonic acid or 2-methacrylamide-3-methylpropanesulfonic acid (including an ammonium salt or metal salts such as Na or K salts), acrylamide propyltrimethyl ammonium chloride and methacrylamide propyltrimethyl ammonium chloride.

The structural unit D constituting Y includes, for example, —$CH_2CH$ $(OH)CH_2O$—, —$CH_2C(CH_3)(OH)CH_2O$—, —$CH_2C(C_2H_5)(OH)CH_2O$—, etc.

Among the structural units described above, the structural unit A is preferably a structural unit derived from vinyl alcohol, the structural unit B is preferably a structural unit derived from vinyl acetate, the structural unit C is preferably a structural unit derived from a vinyl monomer including carboxylic acids (including ammonium salts or metal salts such as Na or K salts) or a structural unit derived from a vinyl monomer including sulfonic acid (including an ammonium salt or metal salts such as Na or K salts), and the structural unit D is preferably —$CH_2CH(OH)CH_2O$—.

The structural unit is more preferably a structural unit (structural unit A) derived from vinyl alcohol or a structural unit (structural unit B) derived from vinyl acetate, and most preferably a structural unit derived from vinyl alcohol.

The degree (n) of polymerization of Y in formula (I) is an integer of 10 to 3,500, preferably 10 to 2,000, more preferably 10 to 1,000, still more preferably 10 to 500, and most preferably 50 to 300, in terms of number-average degree of polymerization. When n is less than 10, water-solubility may be insufficient, while when n is higher than 3500, stability of the pigment dispersion may be lowered.

In formula (I), the proportion of the structural units A, B, C and D constituting the water-soluble polymer moiety —$(Y)_n$— is not particularly limited, except that the proportion of the structural unit B is 0 to 40% by mole (the remaining portion is composed of at least one of A, C and D), and the water-soluble polymer moiety may be formed by copolymerizing two or more structural units in an arbitrary ratio or by homopolymerizing only one structural unit other than the structural unit B.

The compound represented by formula (I) includes various compounds ranging from water-soluble to water-dispersible compounds. Insofar as the compound is water-soluble or water-dispersible, the compound may contain structural units other than the structural units A, B, C and D as Y. The other structural units include structural units derived from, for example, ethylene, propylene, isobutene, acrylonitrile, acrylamide, methacrylamide, N-vinylpyrrolidone, vinyl chloride or vinyl fluoride.

The optimum chemical composition, the molecular weight, etc. of the hydrophobic segment (R) and the hydrophilic segment (Y) constituting the compound represented by formula (I) may vary depending on the intended purpose, but for any purposes, the weight ratio of the hydrophobic segment to the hydrophilic segment (R/Y) satisfies preferably the relationship of $0.001 \leq R/Y \leq 2$, and more preferably the relationship of $0.01 \leq R/Y \leq 1$ in view of the effect on dispersion stability.

Preferable examples (Exemplary Compounds P-1 to P-18) of the compounds represented by formula (I) are illustrated in Tables 1 and 2, in which R, X and Y (structural units A, B, C and D) in formula (I) and n (polymerization degree of Y) are shown. However, the invention is not limited thereto.

TABLE 1

| Exemplary Compounds | R | X | Y | | |
|---|---|---|---|---|---|
| | | | A [% by mole] | B [% by mole] | C, % by mole |
| P-1 | S-1[*1] | —S— | 98 | 2 | |
| P-2 | S-1[*1] | —S— | 88 | 12 | |
| P-3 | S-1[*1] | —S— | 98 | 2 | |
| P-4 | n•$C_4H_9$— | —S— | 90 | 10 | |
| P-5 | t•$C_8H_{17}$— | —S— | 88 | 12 | |
| P-6 | n•$C_{30}H_{61}$— | —S— | 88 | 12 | |
| P-7 | n•$C_{18}H_{37}$— | —S— | 98 | 2 | |
| P-8 | $C_{12}H_{25}$-(branched) | —S— | 98 | 2 | |
| P-9 | Poly(methyl methacrylate) | —S— | 94.5 | 2.5 | —(—$CH_2$—$CH(CONHC(CH_3)_2$—$CH_2SO_3Na)$—)—, 3 |
| P-10 | Polystyrene | —S— | 93.6 | 1.4 | —(—$CH_2$—$CH(COONa)$—)—, 5 |
| P-11 | Polyoxypropylene | —S— | 79.1 | 15.9 | —(—$CH_2$—$C(CH_2COONa)(COONa)$—)—, 5 |
| P-12 | Polystyrene | —S— | 89.7 | 0.3 | —(—$CH_2$—$C(CH_2COONa)(COONa)$—)—, 10 |

A —(—$CH_2$—$CH(OH)$—)—,
B —(—$CH_2$—$CH(OCOCH_3)$—)—
[*1]S-1 is the hydrophobic group mentioned above.

TABLE 2

| Exemplary Compounds | R | X | Y | (Polymerization Degree) |
|---|---|---|---|---|
| P-13 | S-1 | —C(=O)—O— | —CH$_2$—CH(OH)—CH$_2$—O— | (10) |
| P-14 | C$_8$H$_{17}$— | —C(=O)—O— | —CH$_2$—CH(OH)—CH$_2$—O— | (10) |
| P-15 | C$_{10}$H$_{21}$— | —C(=O)—O— | —CH$_2$—CH(OH)—CH$_2$—O— | (10) |
| P-16 | C$_{18}$H$_{37}$— | —C(=O)—O— | —CH$_2$—CH(OH)—CH$_2$—O— | (10) |
| P-17 | S-1 | —C(=O)—O— | —CH$_2$—CH(OH)—CH$_2$—O— | (20) |
| P-18 | S-1 | —O— | —CH$_2$—CH(OH)—CH$_2$—O— | (20) |

*1: S-1 is the hydrophobic group mentioned above.

The compounds represented by formula (I) can be synthesized by methods described in, for example, JP-A Nos. 62-288643, 61-254237, 61-254238, 61-254239 and 61-254240. The compounds of formula (I) wherein R is an alkyl group are commercially available, such as MP-103, MP-203 and MP-102 from Kuraray Co., Ltd.

The content of the compound of formula (I) in the ink-jet recording ink is preferably 1 to 50% by mass, more preferably 3 to 30% by mass, and still more preferably 5 to 20% by mass, based on the colored fine particles prepared in the manner described above. When the content is less than 1% by mass, the compound cannot be sufficiently adsorbed onto the surface of a pigment, to cause aggregation of the pigment, while when the content is higher than 50% by mass, viscosity of the ink may be too high, thus easily causing discharge failure.

(Preparation of the Colored Fine Particles and the Ink-Jet Recording Ink)

Specific preparative examples of the colored fine particles and the ink-jet recording ink containing the colored fine particles are shown below.

That is, the colored fine particles can be obtained by mixing at least one kind of oil-soluble dye, at least one kind of oil-soluble polymer or photopolymerizable monomer, at least one kind of high-boiling organic solvent (having a water-solubility of 4 g or less), at least one kind of co-solvent (having a boiling point of 200° C. or less and a water-solubility of 25 g or less) (and additionally, a photopolymerization initiator when a photopolymerizable polymer is used) to prepare an oil phase (organic phase), adding the oil phase to water (aqueous phase) and emulsifying and dispersing the mixture with a homogenizer. The ink-jet recording ink of the invention can be obtained by adding the compound (water-soluble polymer) represented by formula (I) to the colored fine particles and removing the co-solvent.

As the aqueous medium, water is generally used, and a mixed solvent of water and an organic solvent compatible with water may also be used.

Other water-soluble polymers than the compound of formula (I), surfactants, wetting agents, dye stabilizers, emulsion stabilizers, preservatives and anti-fungus agents may be added, if necessary, to the aqueous phase and/or the oil phase.

Preferable examples of the other water-soluble polymers include polyvinyl alcohol, polyvinyl pyrrolidone, polyethylene oxide, polyacrylic acid, polyacrylamide and copolymers thereof, as well as naturally occurring water-soluble polymers such as polysaccharides, casein and gelatin, and these polymers contribute to stabilization just after emulsification and dispersion.

Preferable examples of the surfactants include anionic surfactants such as fatty acid salts, alkyl sulfates, alkyl benzene sulfonates, alkyl naphthalene sulfonates, dialkyl sulfosuccininates, alkyl phosphates, naphthalene sulfonate-formalin condensates and polyoxyethylene alkyl sulfates, and nonionic surfactants such as polyoxyethylene alkyl ethers, polyoxyethylene alkyl allyl ether, polyoxyethylene fatty esters, sorbitan fatty esters, polyoxyethylene sorbitan fatty esters, polyoxyethylene alkyl amines, glycerin fatty esters, oxyethylene oxypropylene block copolymers, acetylene-based polyoxyethylene oxide surfactants SURFYNOLS (Air Products & Chemicals), amine oxide-based amphoteric surfactants such as N,N-dimethyl-N-alkyl amine oxide, and surfactants described on pp. 37-38 in JP-A No. 59-157,636 and in Research Disclosure No. 308119 (1989).

The colored fine particles are prepared by emulsification and dispersion as described above, and when the resulting colored fine particles are used to prepare an ink-jet recording ink, it is particularly important to control the size of the colored fine particles in order to improve printing characteristics. The average particle diameter of the colored fine particles can be determined easily by a known method, for example, by diluting the particles with distilled water such that the concentration of the oil-soluble dye in the ink-jet recording ink is reduced to 0.1 to 1% by mass and then measuring the diameter of the particles with a commercial volume-average particle diameter measuring instrument. The measuring instrument includes, for example, Microtruck UPA manufactured by Nikkiso Co., Ltd.

In the ink-jet recording ink of the invention, the size of the colored fine particles dispersed as oil droplets, in terms of volume-average particle diameter, is preferably 0.01 to 0.5 μm, more preferably 0.01 to 0.3 μm, still more preferably 0.01 to 0.2 μm, from the viewpoint of printing characteristics, smaller particle size of the dispersed particles, excellent dispersion stability, prevention of liquid clogging at the top of a printer nozzle and improvement of cleaning performance.

The coefficient of variation of the particle diameter of the colored fine particles is preferably within 45%, more preferably within 40%, still more preferably 35%. The coefficient of variation of the particle diameter means the coefficient of variation of the particle diameter of the colored fine particles just after preparation of the ink-jet recording ink, and can be calculated from "standard deviation of volume-average particle diameter distribution/volume-average particle diameter".

The specific gravity of the colored fine particles is preferably 0.90 to 1.10, more preferably 0.93 to 1.08, still more preferably 0.95 to 1.05. When the specific gravity is outside of these ranges, the colored fine particles are hardly stably present in an aqueous system. The specific gravity of the colored fine particles can be determined by preparing a solution composed of the components constituting the colored fine particles, removing the co-solvent and measuring the specific gravity by a method described in New Course in Experimental Chemistry, vol. 1, pp. 79-82, Maruzen Co., Ltd. or by its applied method.

In the ink-jet recording ink of the invention, the presence of coarse particles plays a very important role in printing performance. That is, the coarse particles may effect clogging at the top of a nozzle in a printer or adhere to the nozzle, thereby making it impossible to discharge the ink-jet recording ink or causing discharge failure such as twisted discharge to thus affect printing performance seriously. When the ink-jet recording ink of the invention is used in ink-jet recording, it is preferable that the number of 5 μm or more size particles is limited to 10 or less and the number of 1 μm or more size particles to 1,000 or less in 1 μl ink-jet recording ink.

These coarse particles can be removed by known separation means such as centrifugation and precision filtration. The coarse particles may be removed just after emulsification and dispersion, or after additives such as a wetting agent or a surfactant are added to the emulsified dispersion, the coarse particles may be removed just before the dispersion is introduced into a cartridge. In particular, an emulsification dispersing machine for mechanical stirring can be preferably used as a means effective in reducing the average particle diameter of the colored fine particles in the ink-jet recording ink and in removing the coarse particles effectively.

As the emulsification dispersing device, known devices such as a simple stirrer or those in an impeller stirring system, an in-line stirring system, a mill system (colloid mill), and a supersonic system can be used, but in the invention, a high-pressure emulsification dispersing device is preferable, and a high-pressure homogenizer is particularly preferable.

The mechanism of the high-pressure homogenizer is described in detail in U.S. Pat. No. 4533254, JP-A No. 6-47264, etc., and commercial devices include Gaulin homogenizer (A. P. V Gaulin Inc.), a microfluidizer (Microfluidex Inc.), Altimizer (Sugino Machine Co., Ltd.), etc.

The high-pressure homogenizer having a finely pulverizing function in an ultrahigh-pressure jet stream, as described in U.S. Pat. No. 5720551, is particularly effective in emulsification and dispersion in the invention. Examples of the emulsification dispersing device using an ultrahigh-pressure jet stream include DeBEE 2000 (BEE INTERNATIONAL LTD.).

The pressure in emulsification and dispersion using the high-pressure emulsification dispersing device is preferably 50 MPa or more (500 bar or more), more preferably 60 MPa or more (600 bar or more), and still more preferably 180 MPa or more (1800 bar or more).

In the invention, two or more emulsifying devices are particularly preferably used; for example, the mixture is emulsified and dispersed using a stirring emulsifying device and then passed through a high-pressure homogenizer, or the mixture is emulsified and dispersed using a stirring emulsifying device and then through a high-pressure homogenizer, then additives such as a wetting agent or a surfactant are added thereto, and the resulting ink composition just before introduction into a cartridge is passed again through the high-pressure homogenizer.

At the time of emulsification and dispersion, the co-solvent if any in addition to the high-boiling organic solvent is preferably substantially removed from the viewpoint of the stability, safety and hygiene of the emulsified dispersion (colored fine particles), and the co-solvent can be substantially removed by various methods known in the art, for example, by evaporation, vacuum evaporation and ultrafiltration, depending on the type of the co-solvent. The step of removing the co-solvent is carried out preferably as soon as possible just after emulsification and dispersion.

The ink-jet recording ink of the invention may contain other components, as necessary, in addition to the components described above. As the other components, additives such as a drying inhibitor for preventing the ink from being dried to cause clogging at the top of a nozzle, a permeation accelerator for facilitating permeation of the ink into a paper, an antioxidant, a viscosity regulator, a surface tension regulator, a dispersant, a dispersion stabilizer, an anti-fungal agent, a rust preventive, a pH regulating agent, a defoaming agent, a chelating agent and an UV absorber may be suitably selected and used in a suitable amount.

The drying inhibitor is preferably a water-soluble organic solvent that has a lower vapor pressure than that of water. Examples thereof include polyvalent alcohols such as ethylene glycol, propylene glycol, diethylene glycol, polyethylene glycol, thiodiglycol, dithiodiglycol, 2-methyl-1,3-propane diol, 1,2,6-hexane triol, acetylene glycol derivatives, glycerin and trimethylol propane, polyvalent alcohol lower alkyl ethers such as ethylene glycol monomethyl (or ethyl) ether, diethylene glycol monomethyl (or ethyl) ether and triethylene glycol monoethyl (or butyl) ether, heterocyclic rings such as 2-pyrrolidone, N-methyl-2-pyrrolidone, 1,3-dimethyl-2-imidazolidinone and N-ethyl morpholine, sulfur-containing compounds such as sulfolane, dimethyl sulfoxide and 3-sulfolene, multifunctional compounds such as diacetone alcohol and diethanolamine, and urea derivatives. Among these compounds, polyvalent alcohols such as glycerin and diethylene glycol are preferable.

These drying inhibitors may be used alone or as a mixture of two or more thereof. These drying inhibitors are contained preferably in an amount of 10 to 50% by mass in the ink-jet recording ink.

As the permeation accelerator, use can be made of alcohols such as ethanol, isopropanol, butanol, di(tri)ethylene glycol monobutyl ether and 1,2-hexane diol and nonionic surfactants such as sodium laurylsulfate and sodium oleate. The permeation accelerator is used usually in an amount of 10 to 30% by mass in the ink-jet recording ink in order to achieve a sufficient effect, desirably in an amount in such a range as not to cause print blurring or print-through.

The UV absorber is used for the purpose of improving storability of images. As the UV absorber, use can be made of benzotriazole compounds described in JP-A Nos. 58-185677, 61-190537, 2-782, 5-197075 and 9-34057, benzophenone compounds described in JP-A Nos. 46-2784, 5-194483 and U.S. Pat. No. 3,214,463, cinnamic acid compounds described in JP-B Nos. 48-30492, 56-21141 and JP-A No. 10-88106, triazine compounds described in JP-A Nos. 4-298503, 8-53427, 8-239368, 10-182621 and Japanese Patent Application National Publication (Laid-Open) No. 8-501291, compounds described in Research Disclosure No. 24239, and compounds such as stilbene-based and benzoxazole-based compounds that absorb UV rays to exhibit fluorescence, namely, fluorescent brighteners.

The anti-fungal agent includes sodium dehydroacetate, sodium benzoate, sodium pyridinethion-1-oxide, ethyl p-hydroxybenzoate, 1,2-benzoisothiazolin-3-one and salts thereof. These compounds are contained in the range of 0.02 to 1.00% by mass based on the ink-jetting recording ink.

The pH regulating agent can be used preferably for regulating the pH of the colored fine particle dispersion and for imparting dispersion stability, and it is added preferably for adjustment to pH 4.5 to 10.0, more preferably to pH 6 to 10.0. The pH regulating agent includes basic materials such as organic bases and inorganic alkalis and acidic materials such as organic acids and inorganic acids.

The organic bases include triethanolamine, diethanolamine, N-methyldiethanolamine and dimethylethanolamine. The inorganic alkalis include alkali metal hydroxides (for example, sodium hydroxide, lithium hydroxide, potassium hydroxide, etc.), carbonates (for example, sodium carbonate, sodium bicarbonate, etc.), ammonia, and the like.

The organic acids include acetic acid, propionic acid, trifluoroacetic acid and alkylsulfonic acid. The inorganic acids include hydrochloric acid, sulfuric acid and phosphoric acid.

The surface tension regulator includes nonionic, cationic or anionic surfactants. For example, the surfactant usable in emulsification and dispersion can be used, but the surfactant in this case is preferably the one having a solubility in water at 25° C. of 0.5% or more.

The surface tension of the ink-jet recording ink of the invention with or without using the surface tension modifier is preferably 20 to 60 mN/m, and more preferably 25 to 45 mN/m. The viscosity of the ink is preferably 30 mPa·s or less, and more preferably 20 mPa·s or less.

The image-forming method of the invention comprises forming an image on a recording material with the ink-jet recording ink of the invention that contains colored fine particles comprising at least one kind of oil-soluble dye, at least one kind of oil-soluble polymer or photopolymerizable monomer and generally at least one kind of high-boiling organic solvent, and the compound (water-soluble polymer) represented by formula (I). The ink-jet recording ink of the invention is discharged via the top of a nozzle onto a recording material to form an image thereon and then fusing at least the colored fine particles by heat treatment and/or pressurization of the colored fine particles to thereby fix the image to the recording material.

The oil-soluble dye preferably comprises at least one compound selected from the group consisting of a compound represented by formula (1), a compound represented by formula (2), a compound represented by formula (Y-I), a compound represented by formula (M-I) and a compound represented by formula (C-I).

The recording material preferably comprises a porous resin layer that contains at least one layer of thermoplastic hydrophobic polymer particles on a support. The average particle diameter of the thermoplastic hydrophobic polymer particles is preferably greater than the average particle diameter of the colored fine particles, and the average particle diameter $d^1$ (μm) of the colored fine particles and the average particle diameter $d^2$ (μm) of the thermoplastic oil-soluble polymer particles are preferably in such a range as to satisfy the relationship: $2<d^2/d^1<100$. It is preferable that the thermoplastic hydrophobic polymer particles and the oil-soluble polymer contained in the colored fine particles contain at least one common monomer unit.

In the image-forming method of the invention, the ink-jet recording ink of the invention described above is used. The ink-jet recording ink is prepared preferably by mixing an oil phase that contains at least one kind of oil-soluble dye, at least one kind of oil-soluble polymer, at least one kind of high-boiling organic solvent (having a water-solubility of 4 g or less), and if necessary, at least one kind of co-solvent (having a boiling point of 200° C. or less and a water-solubility of 25 g or less) with an aqueous medium (aqueous phase), then emulsifying and dispersing the mixture, followed by removing the co-solvent, and the resultant ink-jet recording ink comprises colored fine particles having an average particle diameter of 0.01 to 0.5 μm, a coefficient of variation of 45% or less for the particle diameter, and a specific density of 0.9 to 1.2. The ink nozzle or the like used in forming an image by the image-forming method of the invention is not particularly limited and may be selected suitably depending on the purpose.

EXAMPLES

Hereinafter, the present invention is described in more detail by reference to the Examples, but the invention is not limited to the Examples. Unless otherwise indicated, "parts" and "%" are all by weight in the Examples.

Examples 1 to 8

-Preparation of Inks 101 to 108-

0.6 part of an oil-soluble dye (a) shown below, 1.4 parts of an oil-soluble polymer (butyl acrylate/methyl methacrylate copolymer (copolymerization ratio (molar ratio)=50/50)) and 0.3 part of compound (B-1) shown below were mixed with 10 parts of ethyl acetate to give solution I (organic phase). Separately, 0.3 part of sodium di(2-ethylhexyl)sulfosuccinate was added to 15 parts of water to give solution II (aqueous phase).

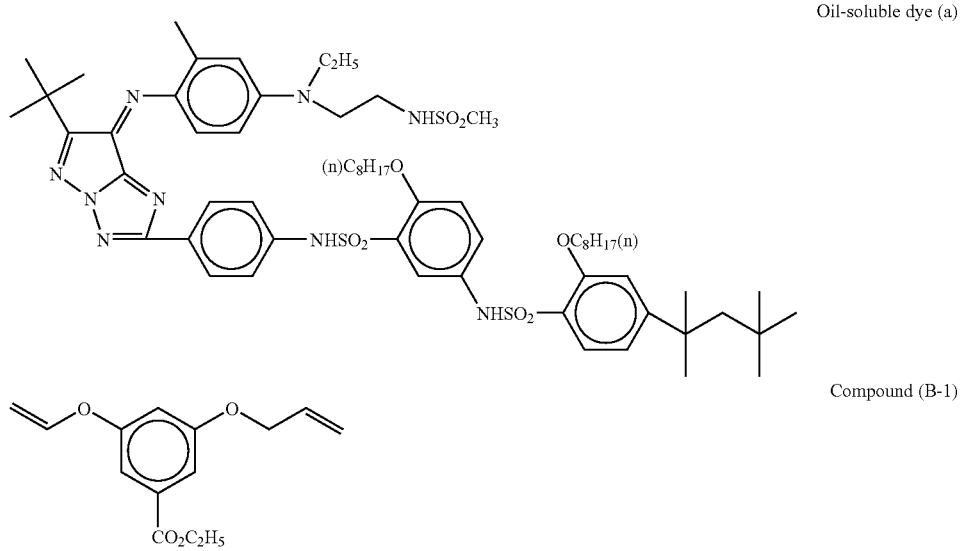

Oil-soluble dye (a)

Compound (B-1)

The solution I was added to the solution II, and the mixture was emulsified and dispersed using a homogenizer. Then, a water-soluble polymer (compound represented by formula (I)) shown in Table 3 was added thereto (in an amount summarized in Table 3), the resultant mixture was stirred, and the solvent ethyl acetate was removed under reduced pressure, whereby a colored fine particle dispersion D-1 having a solids content of 10% was obtained. The particle diameter of dispersed droplets (organic phase) in the colored fine particle dispersion D-1, as determined with a particle size distribution measuring instrument LB-500 (Horiba, Ltd.), was 85 nm in terms of volume-average particle diameter.

The obtained colored fine particle dispersions D-1 to D-8, respectively, were mixed with other components described below to give the following composition and filtered through a 0.45 μm filter, to thus prepare the ink-jet recording inks 101 to 108 of the invention.

| The colored fine particle dispersions (D-1 to D-8) | 60 parts |
|---|---|
| Diethylene glycol | 5 parts |
| Glycerin | 15 parts |
| Diethanol amine | 1 part |
| Polyethylene glycol | 1 part |
| Water | an amount to make a total of 100 parts |

TABLE 3

| | Ink | Colored Fine Particle Dispersion | Water-soluble Polymer[*1] R[*2] | n[*2] | Addition amount[*3] |
|---|---|---|---|---|---|
| Example 1 | 101 | D-1 | $C_{12}H_{25}$ | 10 | 7 |
| Example 2 | 102 | D-2 | $C_{12}H_{25}$ | 10 | 7 |
| Example 3 | 103 | D-3 | $C_{12}H_{25}$ | 10 | 7 |
| Example 4 | 104 | D-4 | $C_{12}H_{25}$ | 20 | 7 |
| Example 5 | 106 | D-5 | MP-103[*4] | | 7 |
| Example 6 | 105 | D-6 | $C_{12}H_{25}$ | 10 | 7 |
| Example 7 | 107 | D-7 | $C_{12}H_{25}$ | 20 | 7 |
| Example 8 | 108 | D-8 | MP-203[*4] | | 7 |

TABLE 3-continued

| | Ink | Colored Fine Particle Dispersion | Water-soluble Polymer[*1] R[*2] | n[*2] | Addition amount[*3] |
|---|---|---|---|---|---|
| Example 9 | 109 | D-9 | $C_{12}H_{25}$ | 10 | 7 |
| Comparative Example 1 | 110 | D-10 | — | — | |
| Comparative Example 2 | 111 | D-11 | — | — | |

[*1] Compound represented by formula (I)
[*2] R and n represent R and n, respectively, in formula (I).
[*3] The ratio (% by mass) of the water-soluble polymer to a total amount of the oil-soluble polymer and the colored fine particles
[*4] MP-103 and MP-203 are terminal-alkyl-modified polyvinyl alcohols manufactured by Kuraray Co., Ltd.

Example 9

A colored fine particle dispersion D-9 was obtained in the same manner as in Example 1, except that 1.4 parts of the oil-soluble polymer used in preparation of the solution I was replaced by 1.7 parts of RAPI-CURE DPE-2 (ISP Japan) and 0.1 part of CYRAURE UV6990 (Union Carbide Japan), to prepare the ink-jet recording ink 109 of the invention.

Comparative Example 1

A comparative ink-jet recording ink 110 was prepared in the same manner as in Example 1, except that after the solutions I and II were mixed and emulsified using a homogenizer, the water-soluble polymer (compound represented by formula (I)) was not added thereto. The solids content of the colored fine particle dispersion D-10 thus obtained was 17.3%, and the particle diameter of dispersed droplets (organic phase) in the colored fine particle dispersion D-10, as determined in the same manner as in the Examples, was 85 nm in terms of volume-average particle diameter.

Comparative Example 2

A comparative ink-jet recording ink 111 was prepared in the same manner as in Comparative Example 1, except that the compound (B-1) was replaced by compound (B-2) shown below. The solids content of the colored fine particle dispersion D-11 thus obtained was 17.3%, and the particle diameter of dispersed droplets (organic phase) in the colored fine particle dispersion D-11, as determined in the same manner as in the Examples, was 80 nm in terms of volume-average particle diameter.

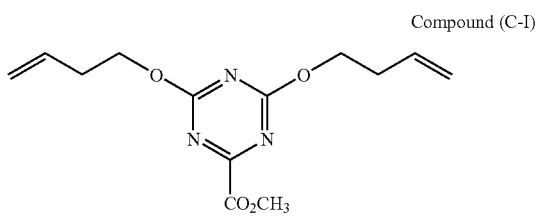

Compound (C-I)

-Image Formation and Evaluation-

Each of the ink-jet recording inks 101 to 111 prepared above was introduced into a black ink cartridge in an inkjet printer PM-950C (Seiko Epson Corporation), and after cleaning the head, the ink was left standing in the cartridge for 1 month. Without conducting head cleaning, this printer was used to print images on an ink-jet photo glossy paper EX (Fuji Photo Film Co., Ltd.), and each ink was evaluated for discharge stability and image formability on the basis of the following evaluation criteria. The evaluation results are summarized in Table 4.

EVALUATION CRITERIA

A: Neither streaks on the image nor clogging was recognized.
B: Slight streaks occurred on the image.
C: Printing was possible, the image was blurred.
D: Printing was impossible due to ink clogging.

TABLE 4

|  | Ink | Discharge stability/Image formability |
|---|---|---|
| Example 1 | 101 | A |
| Example 2 | 102 | A |
| Example 3 | 103 | A |
| Example 4 | 104 | A |
| Example 5 | 105 | A |
| Example 6 | 106 | A |
| Example 7 | 107 | A |
| Example 8 | 108 | A |
| Example 9 | 109 | A |
| Comparative Example 1 | 110 | B to C |
| Comparative Example 2 | 111 | B to C |

As summarized in Table 4, the ink-jet recording inks 101 to 109 of the invention comprising the compound of formula (I) as a water-soluble polymer together with a pigment were revealted to be excellent in discharge stability after storage for a long time and superior in dispersion stability during storage, and the formed image was free of ink blurring or streaks, to thereby show good qualities. On the other hand, the comparative ink-jet recording inks 110 to 111 prepared without including the water-soluble polymer produced a blurred image due to ink clogging. That is, the ink-jet recording inks 110 to 111 were found to be inferior in dispersion stability during storage for a long time.

As detailed above, the present invention provides an ink-jet recording ink which comprises a disperse dye in which an oil-soluble dye is dispersed in an aqueous phase as oil droplets (oil phase), and the dispersed oil droplets (dispersed droplets) have a small particle diameter, and in which the ink-jet recording ink has excellent dispersion stability and storability over a prolonged period, suppresses clogging at the tip of a nozzle, and is superior in its cleanability when clogging occurs. The invention also provides an image-forming method with which high-quality images can be formed in a stable manner with the use of the above-described ink-jet recording ink, without either impairing image quality or creating problems in image formation as a result of deficiencies at the discharge opening.

What is claimed is:

1. An ink-jet recording ink comprising colored fine particles including an oil-soluble dye and an oil-soluble polymer, and a compound represented by formula (I):

Formula (I)

$$R\!-\!X\!-\!(Y)_n\!-\!H$$

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

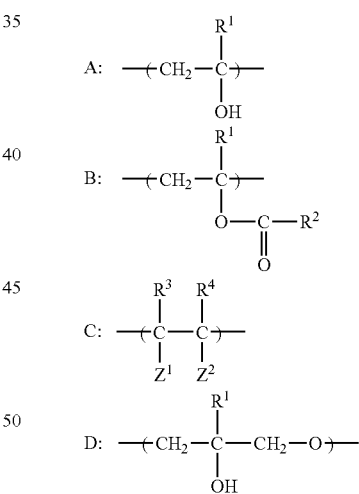

wherein, in the structural units A, B, C and D, $R^1$ represents a hydrogen atom or a $C_1$-$C_6$ alkyl group; $R^2$ represents a hydrogen atom or a $C_1$-$C_{10}$ alkyl group; $R^3$ represents a hydrogen atom or a methyl group; $R^4$ represents a hydrogen atom, —$CH_3$, —$CH_2COOH$ (including an ammonium salt or an alkali metal salt thereof) or —CN; $Z^1$ represents a hydrogen atom, —COOH (including an ammonium salt or an alkali metal salt thereof or —$CONH_2$; $Z^2$ represents —COOH (including an ammonium salt or an alkali metal salt thereof, —$SO_3H$ (including an ammonium salt or an alkali metal salt thereof), —$OSO_3H$ (including an ammonium salt or an alkali metal salt thereof), —$CH_2SO_3H$ (including an ammonium salt or an alkali metal salt thereof), —$CONHC(CH_3)_2$ $CH_2SO_3H$ (including an ammonium salt or an alkali metal salt thereof) or $-CONHCH_2CH_2CH_2N^+(CH_3)_3Cl^-$.

2. The ink-jet recording ink according to claim 1, wherein the oil-soluble polymer has a dissociable group in an amount of 0.2 to 4.0 mmol/g.

3. The ink-jet recording ink according to claim 2, wherein the dissociable group is at least one of a carboxyl group and a sulfonic acid group.

4. The ink-jet recording ink according to claim 1, wherein the colored fine particles are prepared by adding to an aqueous phase an organic phase including the oil-soluble dye and the oil-soluble polymer, and emulsifying and dispersing a resultant mixture.

5. The ink-jet recording ink according to claim 1, wherein the oil-soluble dye is selected from the group consisting of an anthraquinone dye, naphthoquinone dye, styryl dye, indoaniline dye, azo dye, nitro dye, coumarin dye, methine dye, porphyrin dye, azaporphyrin dye and phthalocyanine dye.

6. The ink-jet recording ink according to claim 1, wherein the oil-soluble dye is contained in an amount of 0.05 to 50% by mass based on a total mass of the ink.

7. The ink-jet recording ink according to claim 1, wherein the oil-soluble polymer is contained in an amount of 10 to 500% by mass based on a mass of the oil-soluble dye.

8. The ink-jet recording ink according to claim 1, wherein the compound represented by formula (I) is contained in an amount of 1 to 50% by mass based on a mass of the colored fine particles.

9. The ink-jet recording ink according to claim 1, having a viscosity of 30 mPa·s or less.

10. The ink-jet recording ink according to claim 1, wherein the hydrophobic group represented by R in formula (I) is an aliphatic group or an aromatic group.

11. The ink-jet recording ink according to claim 10, wherein the hydrophobic group represented by R in formula (I) is an alicyclic group.

12. The ink-jet recording ink according to claim 10, wherein the hydrophobic group represented by R in formula (I) is selected from the group consisting of alkyl, alkenyl, alkynyl, phenyl and naphthyl groups.

13. The ink-jet recording ink according to claim 12, wherein the hydrophobic group represented by R in formula (I) is an alkyl group having 3 to 70 carbon atoms.

14. The ink-jet recording ink according to claim 1, wherein R in formula (I) is a group derived from at least one hydrophobic polymer selected from the group consisting of polystyrene, polymethacrylate, polyacrylate, polyvinyl chloride, and derivatives thereof.

15. The ink-jet recording ink according to claim 13, wherein a polymerization degree of R in formula (I) is from 2 to 500.

16. The ink-jet recording ink according to claim 1, wherein the hetero-bond in X in formula (I) is selected from the group consisting of an ether bond, an ester bond, a thioether bond, a thioester bond, a sulfonyl bond, an amide bond, an imide bond, a sulfonamide bond, a urethane bond, a urea bond, and a thiourea bond.

17. The ink-jet recording ink according to claim 1, wherein the structural unit A is a structural unit derived from vinyl alcohol, α-methylvinyl alcohol, or α-propylvinyl alcohol.

18. The ink-jet recording ink according to claim 1, wherein the structural unit B is a structural unit derived from vinyl acetate, vinyl formate, vinyl propionate, or an α-substitution product thereof.

19. The ink-jet recording ink according to claim 1, wherein the structural unit C is a structural unit derived from acrylic acid, methacrylic acid, itaconic acid, maleic acid, an ammonium salt thereof or a metal salt thereof.

20. The ink-jet recording ink according to claim 1, wherein the structural unit D is selected from the group consisting of $-CH_2CH(OH)CH_2O-$, $-CH_2C(CH_3)(OH)CH_2O-$, and $-CH_2C(C_2H_5)(OH)CH_2O-$.

21. The ink-jet recording ink according to claim 1, wherein a mass ratio of R to $(Y)_n$ in formula (I) is from 0.01 to 2, the mass ratio being calculated using atomic weights of respective atoms in R and $(Y)_n$.

22. The ink-jet recording ink according to claim 1, wherein $(Y)_n$ in formula (I) comprises, as a structural unit thereof, ethylene, propylene, isobutene, acrylonitrile, acrylamide, methacrylamide, N-vinylpyrrolidone, vinyl chloride or vinyl fluoride.

23. The ink-jet recording ink according to claim 1, further comprising water.

24. An image-forming method to form an image, comprising using an ink-jet recording ink comprising colored fine particles including an oil-soluble dye and an oil-soluble polymer, and a compound represented by formula (I):

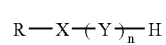

Formula (I)

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

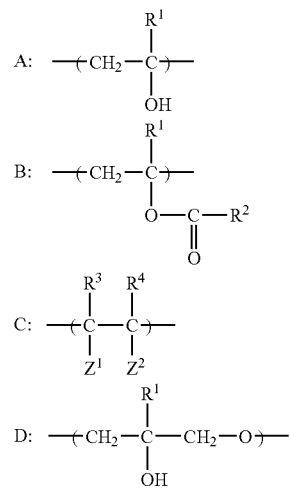

wherein, in the structural units A, B, C and D, $R^1$ represents a hydrogen atom or a $C_1$-$C_6$ alkyl group; $R^2$ represents a hydrogen atom or a $C_1$-$C_{10}$ alkyl group; $R^3$ represents a hydrogen atom or a methyl group; $R^4$ represents a hydrogen atom, $-CH_3$, $-CH_2COOH$ (including an ammonium salt or an alkali metal salt thereof) or $-CN$; $Z^1$ represents a hydrogen atom, $-COOH$ (including an ammonium salt or an alkali metal salt thereof) or $-CONH_2$; $Z^2$ represents $-COOH$ (including an ammonium salt or an alkali metal salt thereof), $-SO_3H$ (including an ammonium salt or an alkali metal salt thereof, $-OSO_3H$ (including an ammonium salt or an alkali metal salt thereof, —CH$_2$SO$_3$H (including an ammonium salt or an alkali metal salt thereof), —CONHC(CH$_3$)$_2$CH$_2$SO$_3$H (including an ammonium salt or an alkali metal salt thereof) or —CONHCH$_2$CH$_2$CH$_2$N$^+$(CH$_3$)$_3$Cl$^-$.

25. An inkjet recording ink comprising colored fine particles including an oil-soluble dye and a photopolymerizable monomer, and a compound represented by formula (I):

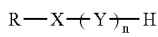

Formula (I)

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

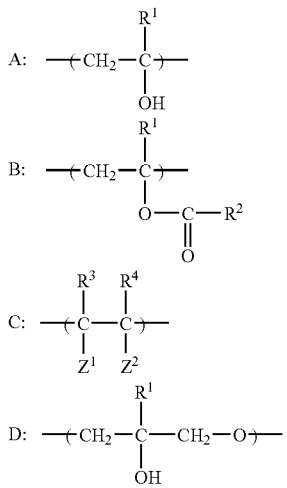

wherein, in the structural units A, B, C and D, R$^1$ represents a hydrogen atom or a C$_1$-C$_6$ alkyl group; R$^2$ represents a hydrogen atom or a C$_1$-C$_{10}$ alkyl group; R$^3$ represents a hydrogen atom or a methyl group; R$^4$ represents a hydrogen atom, —CH$_3$, —CH$_2$COOH (including an ammonium salt or an alkali metal salt thereof) or —CN; Z$^1$ represents a hydrogen atom, —COOH (including an ammonium salt or an alkali metal salt thereof) or —CONH$_2$; Z$^2$ represents —COOH (including an ammonium salt or an alkali metal salt thereof), —SO$_3$H (including an ammonium salt or an alkali metal salt thereof), —OSO$_3$H (including an ammonium salt or an alkali metal salt thereof), —CH$_2$SO$_3$H (including an ammonium salt or an alkali metal salt thereof), —CONHC(CH$_3$)$_2$CH$_2$SO$_3$H (including an ammonium salt or an alkali metal salt thereof) or —CONHCH$_2$CH$_2$CH$_2$N$^+$(CH$_3$)$_3$Cl$^-$.

26. The inkjet recording ink according to claim 25, wherein the colored fine particles are prepared by adding to an aqueous phase an organic phase including the oil-soluble dye and the photopolymerizable monomer, and emulsifying and dispersing a resultant mixture.

27. The inkjet recording ink according to claim 25, wherein the hydrophobic group is an aliphatic group, an aromatic group or an alicyclic group.

28. The ink-jet recording ink according to claim 25, wherein R is a group derived from at least one hydrophobic polymer selected from polystyrene, polymethacrylate, polyacrylate, polyvinyl chloride, and derivatives thereof.

29. The ink-jet recording ink according to claim 25, wherein the oil-soluble dye is selected from the group consisting of an anthraquinone dye, naphthoquinone dye, styryl dye, indoaniline dye, azo dye, nitro dye, coumarin dye, methine dye, porphyrin dye, azaporphyrin dye and phthalocyanine dye.

30. The ink-jet recording ink according to claim 25, wherein the oil-soluble dye is contained in an amount of 0.05 to 50% by mass based on a total mass of the ink.

31. The ink-jet recording ink according to claim 25, wherein the compound represented by formula (I) is contained in an amount of 1 to 50% by mass based on a mass of the colored fine particles.

32. The inkjet recording ink according to claim 25, wherein the photopolymerizable monomer is contained in an amount of 50 to 500% by mass based on a mass of the oil-soluble dye.

33. The ink-jet recording ink according to claim 25, having a viscosity of 30 mPa·s or less.

34. An image-forming method to form an image, comprising using an ink-jet recording ink comprising colored fine particles including an oil-soluble dye and a photopolymerizable monomer, and a compound represented by formula (I):

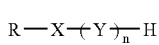

Formula (I)

wherein, in formula (I), R represents a hydrophobic group or a group derived from a hydrophobic polymer; X represents a divalent linking group having a hetero-bond; Y represents a group including at least one represented by the following structural units A, C and D, and the following structural unit B at 0 to 40% by mole; and n is an integer of 10 to 3,500;

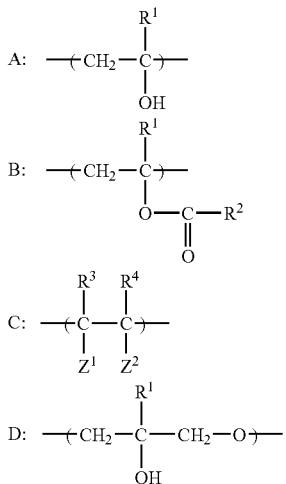

wherein, in the structural units A, B, C and D, R$^1$ represents a hydrogen atom or a C$_1$-C$_6$ alkyl group; R$^2$ represents a hydrogen atom or a C$_1$-C$_{10}$ alkyl group; R$^3$ represents a hydrogen atom or a methyl group; R$^4$ represents a hydrogen atom, —CH$_3$, —CH$_2$COOH (including an ammonium salt or an alkali metal salt thereof or —CN; Z$^1$ represents a hydrogen atom, —COOH (including an ammonium salt or an alkali metal salt thereof or —CONH$_2$; Z$^2$ represents —COOH (including an ammonium salt or an alkali metal salt thereof, —SO$_3$H (including an ammonium salt or an alkali metal salt thereof, —OSO$_3$H (including an ammonium salt or an alkali metal salt thereof, —CH$_2$SO$_3$H (including an ammonium salt or an alkali metal salt thereof, —CONHC(CH$_3$)$_2$CH$_2$SO$_3$H (including an ammonium salt or an alkali metal salt thereof or —CONHCH$_2$CH$_2$CH$_2$N$^+$(CH$_3$)$_3$Cl$^-$.

* * * * *